United States Patent [19]
Lection et al.

[11] Patent Number: 5,742,287
[45] Date of Patent: Apr. 21, 1998

[54] CONTEXT SENSITIVE BORDERS WITH COLOR VARIATION FOR USER SELECTABLE OPTIONS

[75] Inventors: David Bruce Lection, Raleigh; Mark Edward Molander, Cary, both of N.C.

[73] Assignee: International Business Machines Corp., Armonk, N.Y.

[21] Appl. No.: 682,204

[22] Filed: Jul. 17, 1996

[51] Int. Cl.[6] .................................................. G06F 3/00
[52] U.S. Cl. ........................ 345/355; 345/349; 345/352; 345/126
[58] Field of Search .................................. 345/326–358, 345/126–127, 131, 139, 145–146, 902

[56] References Cited

U.S. PATENT DOCUMENTS

| | | | |
|---|---|---|---|
| 4,868,766 | 9/1989 | Oosterholt | 345/355 X |
| 5,179,656 | 1/1993 | Lisle | 345/355 |
| 5,276,795 | 1/1994 | Hoeber et al. | 345/353 |
| 5,295,243 | 3/1994 | Robertson et al. | 345/355 |
| 5,303,388 | 4/1994 | Kreitman et al. | 345/355 |
| 5,347,628 | 9/1994 | Brewer et al. | 345/355 |
| 5,381,158 | 1/1995 | Takahara et al. | 345/355 |
| 5,388,202 | 2/1995 | Squires et al. | 345/355 |
| 5,452,406 | 9/1995 | Butler et al. | 345/126 |
| 5,463,722 | 10/1995 | Venolia | 345/355 X |
| 5,555,354 | 9/1996 | Strasnick et al. | 395/355 X |
| 5,608,850 | 3/1997 | Robertson | 345/127 |

*Primary Examiner*—John E. Breene
*Attorney, Agent, or Firm*—Jeanine S. Ray-Yarletts

[57] ABSTRACT

Methods, data processing systems and program products for providing user interfaces with context sensitive borders to user selectable options. The context sensitive borders are created by providing a border to a user selectable option comprised of a plurality of picture elements wherein color characteristics from picture elements neighboring the border are varied to define the color characteristics of the picture elements of the border. The borders provided may provide a three dimensional appearance to the user selectable option and the user selectable option may be represented on the screen by an icon. The border may have a different perimeter than the icon corresponding to the user selectable option. The neighboring picture elements from which the border is derived may be adjacent to the border or may be the underlying elements of the border. The color characteristics may be varied by varying brightness and/or saturation.

64 Claims, 16 Drawing Sheets

CONTEXT SENSITIVE BORDERS WITH COLOR VARIATION FOR USER SELECTABLE OPTIONS

FIELD OF THE INVENTION

The present invention relates generally to user interfaces. More particularly, the present invention relates to displaying selectable options in a graphic user interface environment.

BACKGROUND OF THE INVENTION

Increases in processing capability and decreases in cost of personal computers has led to the proliferation of personal computers in all aspects of society. Personal computers are utilized in schools, homes and in business. Furthermore, with the decreased costs of personal computers, it has become more feasible from a cost perspective to use computers for tasks and to carry out functions which were previously done without the use of computers.

One example of the proliferation of computers in education, the home and the workplace is the increased use of portable computers. In recent years, decreasing power requirements and increased performance of microprocessors has lead to increased use of portable data processors such as a laptop computers, notebook computers or personal data assistants (PDAs). Portable data processors provide much, if not all, of the functionality of the older, immobile desktop computers but add portability as a feature. In fact, advances in display technology have made high resolution, low power, color or monochrome displays commonplace on portable computers which has furthered the replacement of desktop systems with portable systems. As portable data processors have taken the place of many desktop computers they have changed the perception of computers from a back room appliance used by data processors to an interactive tool accessible to anyone.

Even though portable data processors were put to new and different uses by new and different users, the same user interfaces which were used in stationary desktop computing were generally brought to portable data processors. The stationary desktop computer's user interface paradigm generally involved providing a general purpose operating system which allowed for access to any application that was available from the processor. Thus, desktop units generally have a very generic and abstract user interface which will generally work in diverse situations for diverse types of applications.

At the same time that technological advances in the computer industry brought ever increasing mobility to computers, demand for increased productivity among the workforce has brought more employees in contact with computers. This contact may be in the form of a desktop computer, a portable computer such as a notebook computer or it may be in the form of a more customized processing application such as a PDA. As described above, despite the proliferation of computing power among an ever less computer trained user pool, the user interface for all types of computers has generally remained the generic desktop interface. The generic, multi-purpose nature of these user interfaces assumes some level of familiarity and experience with computers which is less and less present among computer users. Thus, more people with less computer training are required to operate computers with a more generic, abstract and intimidating user interface. Furthermore, even if training is available, quite often these users are in high turn-over positions which presents efficiency and productivity difficulties if extensive training is required before a new user can become productive. Also, in many instances, this disparity between the experience and training level of the user and the capabilities of the computer naturally leads to intimidation and an unwillingness to take full advantage of the capabilities of the computer.

Like the portable data processor, the desktop computer has also seen a rise in the number of users in recent years. Like the portable computer, the user interface for most computers is still a general purpose interface with versatility and operability taking priority over usability and ease of training. Efforts to overcome these limitations have led to user interfaces such as Microsoft® Bob® which uses a three dimensional representation of familiar situations to "navigate" through the user interface. Other f5 such "social" interfaces are also being developed as discussed in the article "PCs Gain Social Skills", *Information Week*, Jul. 3, 1995.

As the backgrounds of user interfaces become more complex, it becomes more and more difficult for users to discern the location of areas of the screen where user selectable options are located. Existing attempts to overcome this problem have included changing the icon of the pointing device when located in a user selectable area of the screen or outlining the user selectable area of the screen in a monochromatic border. Other attempts have been to use background independent borders around user selectable areas of the screen. However, each of these options either detract from the intended effect of the user interface to create a three dimensional environment, fail to fully designate user selectable areas of the screen or force the user to "hunt" through the user interface to find the user selectable areas.

One example of a user interface which utilizes fixed relationships between a border and a background is International Business Machine's OS/2® Warp. As seen in FIG. 1, the "Launchpad" 10 feature of OS/2® Warp illustrates a "button" concept of bordering a user selectable option so as to appear as a push-button switch. The buttons 12 have a border surrounding them which is a created from predefined, fixed picture element colors. This "button" system is usable in the OS/2® Warp environment because the backgrounds to the buttons are controlled by the operating system and are regular all around the periphery of the button. Furthermore, the buttons are set in a user interface environment where push-buttons are a logical method of accepting user selected input.

Unlike the user interface of the OS/2® Warp environment, in a three dimensional user interface, in order to create a more intuitive and user friendly user interface, a background is created to present a more real-world, familiar appearance to a user interface. Accordingly, the background may vary around the area of the screen corresponding to a user selectable option. This variance in the background creates the possibility of "dropout" of the border to the user selectable area and/or may result in borders which are distracting to the user in that they detract from the overall impression of the user interface. In any case, the usability of user interfaces may be reduced by the existing methods of designating user selectable areas of the screen. Thus, there is a need for improvements in user interfaces to allow greater access to computers by users of all types of experience and training levels.

OBJECTS AND SUMMARY OF THE INVENTION

In view of the above limitations of existing user interfaces, it is an object of the present invention to provide user interfaces which reduce the complexity of operating a data processor and, thereby, reduces the intimidation felt by users of data processors.

A second object of the present invention is to provide user interfaces which emphasize available selections and makes data more accessible to the user while not distracting from the overall appearance of the user interface.

A further object of the present invention is to provide user interfaces which reduce the likelihood of user error.

An additional object of the present invention is to increase user productivity by reducing the amount of training required to use a portable data processor.

It is another object of the present invention to provide user interfaces which reduce the amount of prior experience and knowledge of computer systems required to operate the computer system.

These and other objects of the present invention are provided by methods, data processing systems or program products which provide user interfaces with context sensitive borders to user selectable options. Context sensitive borders allow for three-dimensional user interfaces to selectively emphasize appropriate user selectable options while not overly detracting from the appearance of the user interface. Furthermore, context sensitive borders are more likely to be visible regardless of the background of the user interface.

Context sensitive borders are created by providing a border to a user selectable option comprised of a plurality of picture elements wherein color characteristics from picture elements neighboring the border are varied to define the color characteristics of the picture elements of the border. The borders provided may provide a three dimensional appearance to the user selectable option and the user selectable option may be represented on the screen by an icon. Furthermore, the border may have a different perimeter than the icon corresponding to the user selectable option. The user interface may also include buttons to designate a user selectable options.

In a further embodiment of the present invention user interfaces with context sensitive borders are provided by providing a first border section comprised of picture elements circumscribing less than the total perimeter of the user selectable option. The color characteristics of picture elements of the first border section are selected to simulate light incident on a surface defined by the first border section. A second border section is provided comprised of picture elements circumscribing less than the total perimeter of the user selectable option where the characteristics of picture elements of the second border section are selected to simulate a surface defined by the second border section appearing in a shadow. The first and the second border sections are also positioned about the user selectable option so as to make the user selectable option appear three dimensional. The first and the second border sections may be positioned about the user selectable option so as to make the user selectable option appear to be raised from the surrounding background.

In a further embodiment of the present invention the positions of the first and the second border sections are reversed when the user selectable option is selected so as to make the user selectable option appear as a depression in the surrounding background.

In a particular embodiment of the present invention the color characteristics of the neighboring picture elements comprise brightness information. In such an embodiment, the picture elements of the first border section have a higher brightness than the neighboring picture elements of the first border section and the picture elements of the second border section have a lower brightness than the neighboring picture elements of the second border section. In an alternative embodiment the color characteristics of the neighboring picture elements comprises saturation information. In such an alternative embodiment the picture elements of the first border section have a lower saturation than the neighboring picture elements of the first border section and wherein the picture elements of the second border section have a higher saturation than the neighboring picture elements of the second border section.

In a preferred embodiment of the present invention the user interfaces of the present invention comprise a three dimensional graphical user interface.

In a further embodiment of the present invention, the neighboring picture elements comprise picture elements of the background region adjacent the picture elements of the border and are outside the border. The neighboring picture elements may also comprise picture elements adjacent the picture elements of the border and are within the border. The neighboring picture elements may also be the picture elements of the non-varied picture elements of the user interface which correspond to the picture elements of the border.

In another further embodiment of the present invention, at least one additional border comprising picture elements adjacent to the first border are also provided. The color characteristics of picture elements of the additional border are selected based upon the color characteristics of the first border. The color characteristics of the additional border adjacent the first border may be selected to enhance the three dimensional appearance of the user selectable option.

In yet another embodiment of the present invention, the border provided defines a region of the screen wherein a selection made while a pointing device is positioned in the region of the screen within the border selects the user selectable option. In a further embodiment, the location on the screen pointed to by a pointing device is determined and the border is provided when it is determined that the location pointed to by the pointing device is located inside the region of the screen circumscribed the border.

In another alternative further embodiment, where the user interfaces include a plurality of user selectable options, the location on the screen pointed to by a pointing device is also determined. Borders to the plurality of user selectable options are provided where the borders are comprised of picture elements and wherein color characteristics of the picture elements of the borders are defined by varying the color characteristics from the picture elements which neighbor the picture elements of the borders. The color characteristics of the borders of the user selectable options are varied such that the borders corresponding to the user selectable options in closest proximity on the screen to the location pointed to by the pointing device are the most prominent.

As with each of the embodiments described above, the manner in which the color characteristics from the neighboring picture elements is varied may be definable by a user.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system or program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

Figure 1:
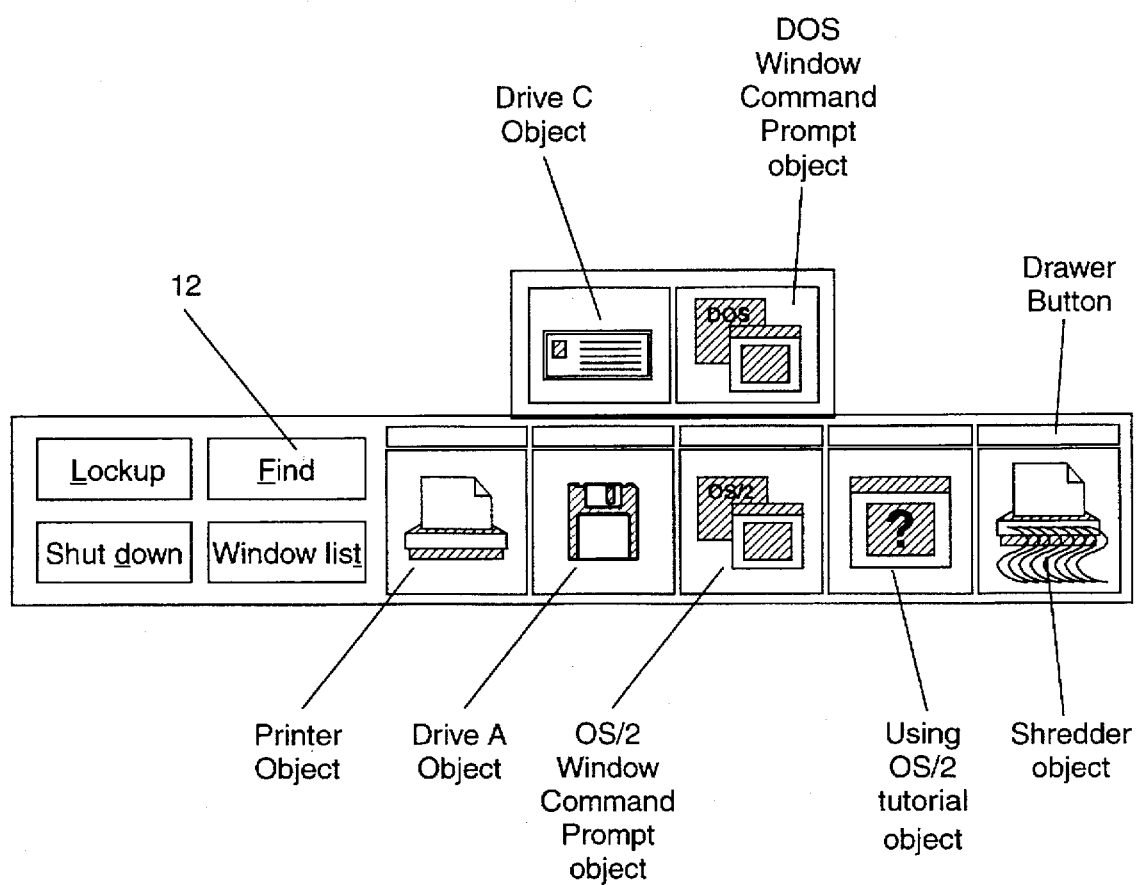
FIG. 1 is a diagram of a conventional screen with buttons for user selection.
Figure 2:
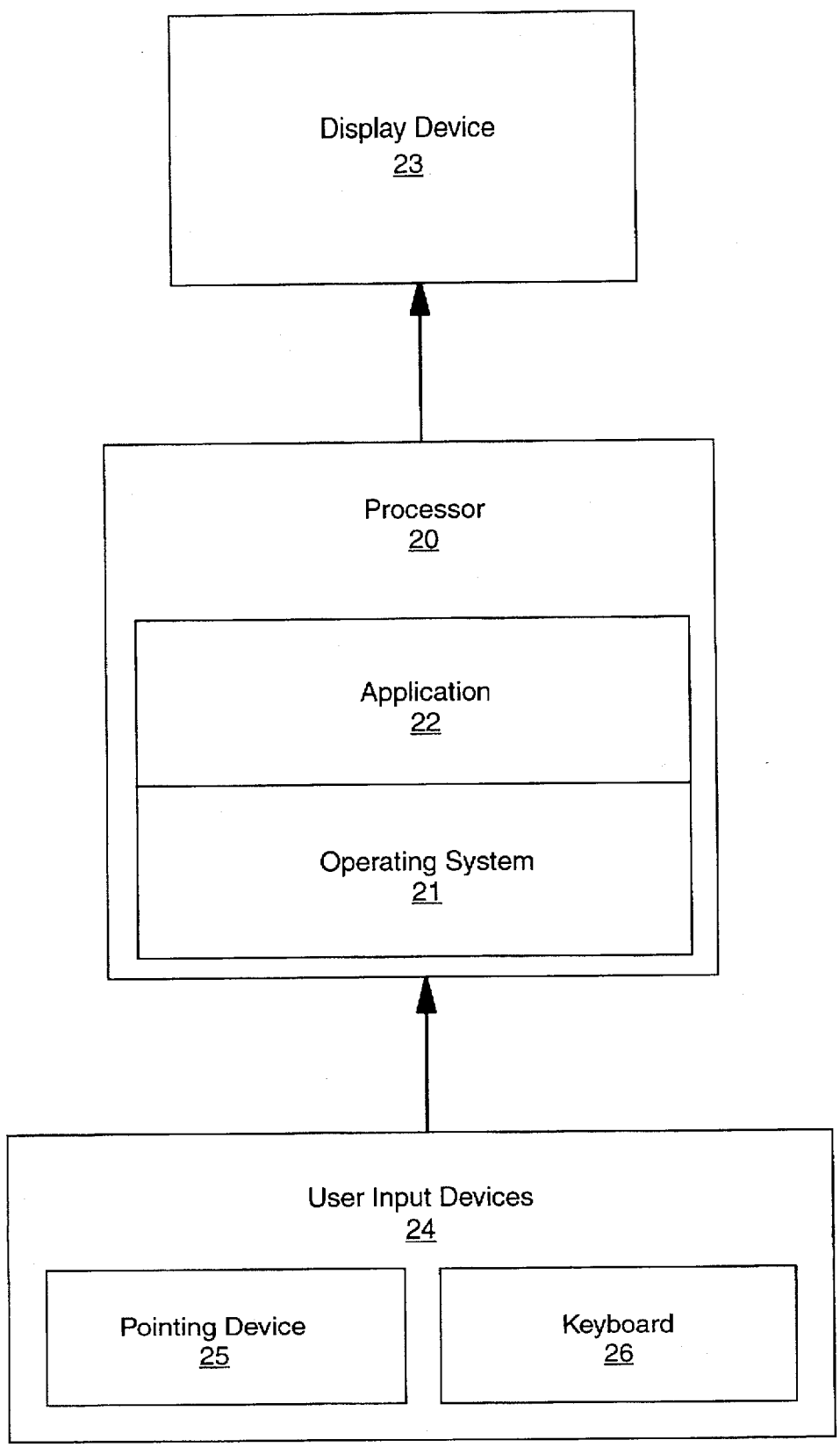
FIG. 2 is a logical diagram of a system utilizing the present invention.

FIG. 2 illustrates a data processing system on which user interfaces according to the present invention may be utilized. As seen in FIG. 2, a data processor 20 may have an operating system 21 resident in the processor. An application 22 may be running on the operating system 21. The processor 20 displays information on a display device 23. The display device 23 has a plurality of picture elements (collectively referred to as a screen) which may define the appearance of a user interface environment displayed on the display device. For each picture element a color characteristics of that element includes hue, brightness, and saturation values. By manipulation of these values for each picture element of the screen the appearance or contents of the screen is established. The contents of the screen of the display device 23 and, therefore, the appearance of the user interface environment, may be controlled or altered by the application 22 or the operating system 21 either individually or in combination.

For obtaining input from a user, the operating system 21, the application 22 or both may utilize user input devices 24. User input devices 24 may include a pointing device 25 and a keyboard 26 or other input devices known to those of skill in the art. User input devices 24 may be used to designate the selection or de-selection of user selectable options associated with regions of the screen of the display device. This selection may be based upon, for example, the location of the screen indicated by a pointing device 25 or by a series of keystrokes input by the keyboard 26.

Figure 3:
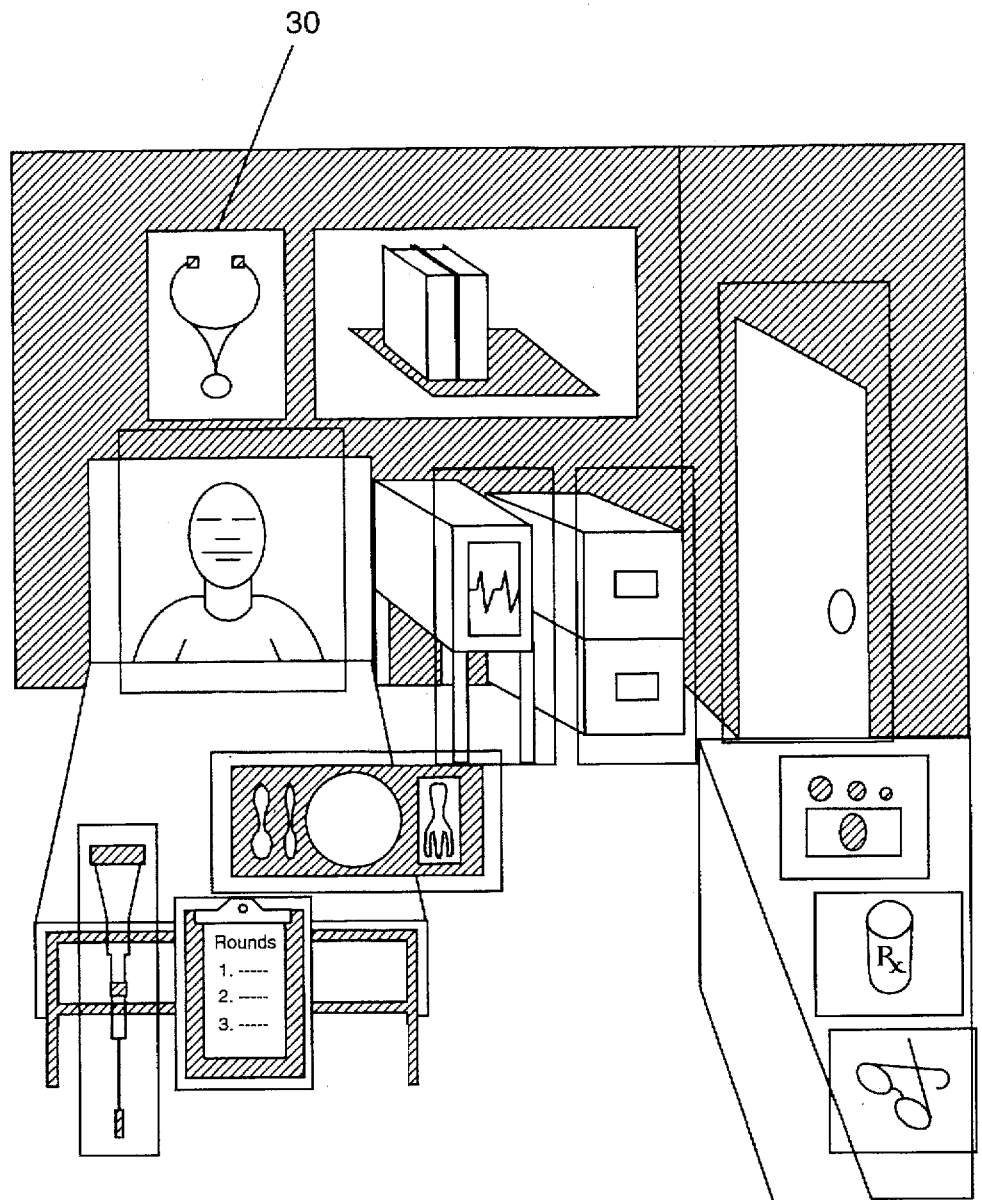
FIG. 3 is an example of a conventional user interface having monochromatic borders.

FIG. 3 illustrates an existing method of designating user selectable options in a three dimensional user interface. As seen in FIG. 3, a monochromatic border 30 is drawn to circumscribe the area of the screen associated with a user selectable option. This monochromatic border, however, distracts from the overall impression of the three dimensional user interface. Furthermore, in the event that the border color corresponds to the color of the picture elements surrounding the border "drop out" may occur and the border will not be visible.

Figure 4:
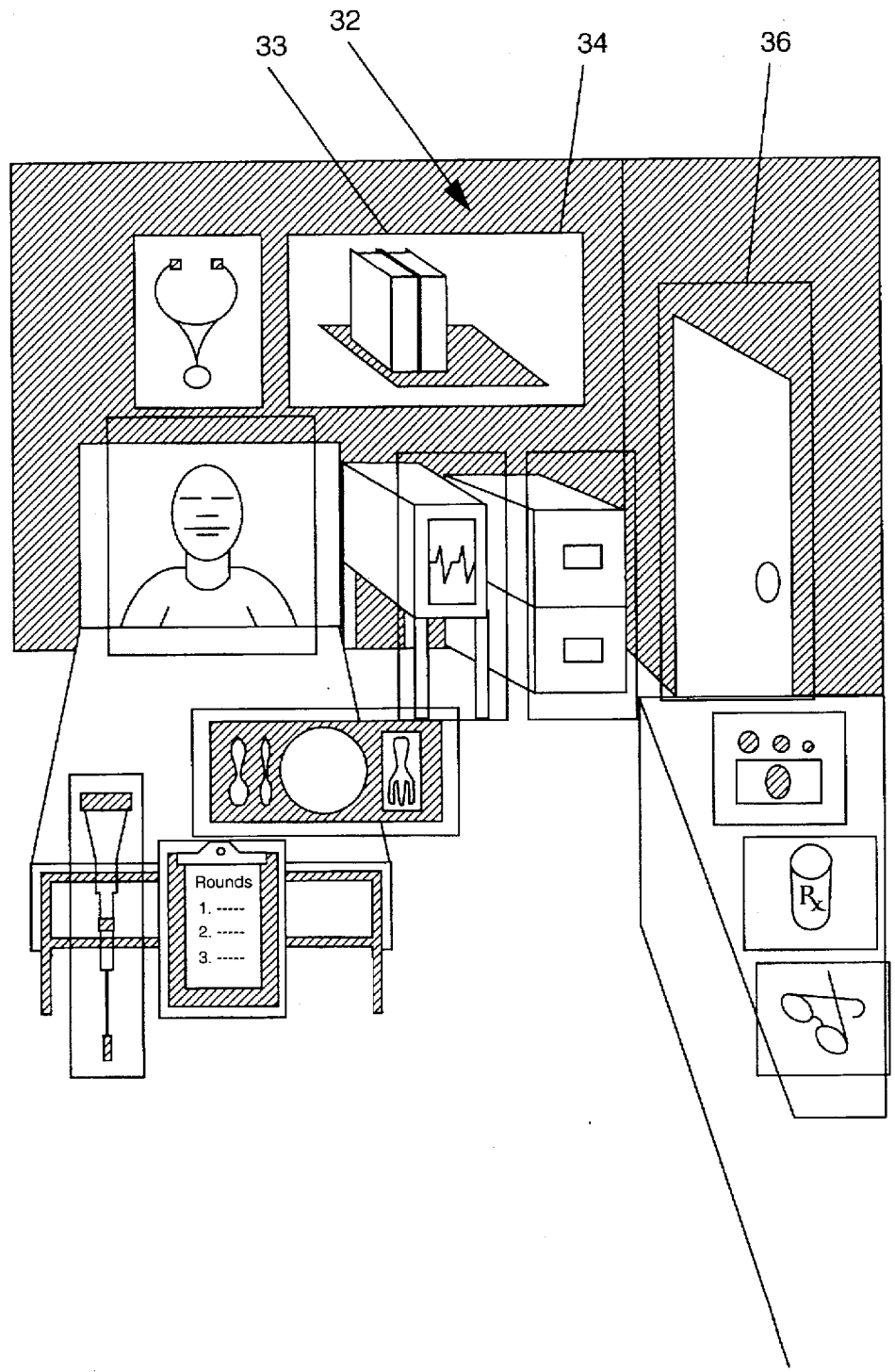
FIG. 4 is an example of a conventional user interface having predefined three dimensional borders.

FIG. 4 illustrates another existing alternative to the monochromatic borders of FIG. 3. As seen in FIG. 4 a border 32 has a light portion 33 and a darker portion 34. The position of the light portion 33 and the darker portion 34 give the region of the user selectable option a three-dimensional appearance. However, as can be seen in FIG. 4 as the background changes a three dimensional appearance is lost. For example, the border 36 around the door icon has lost its three dimensional appearance.

Figure 5:
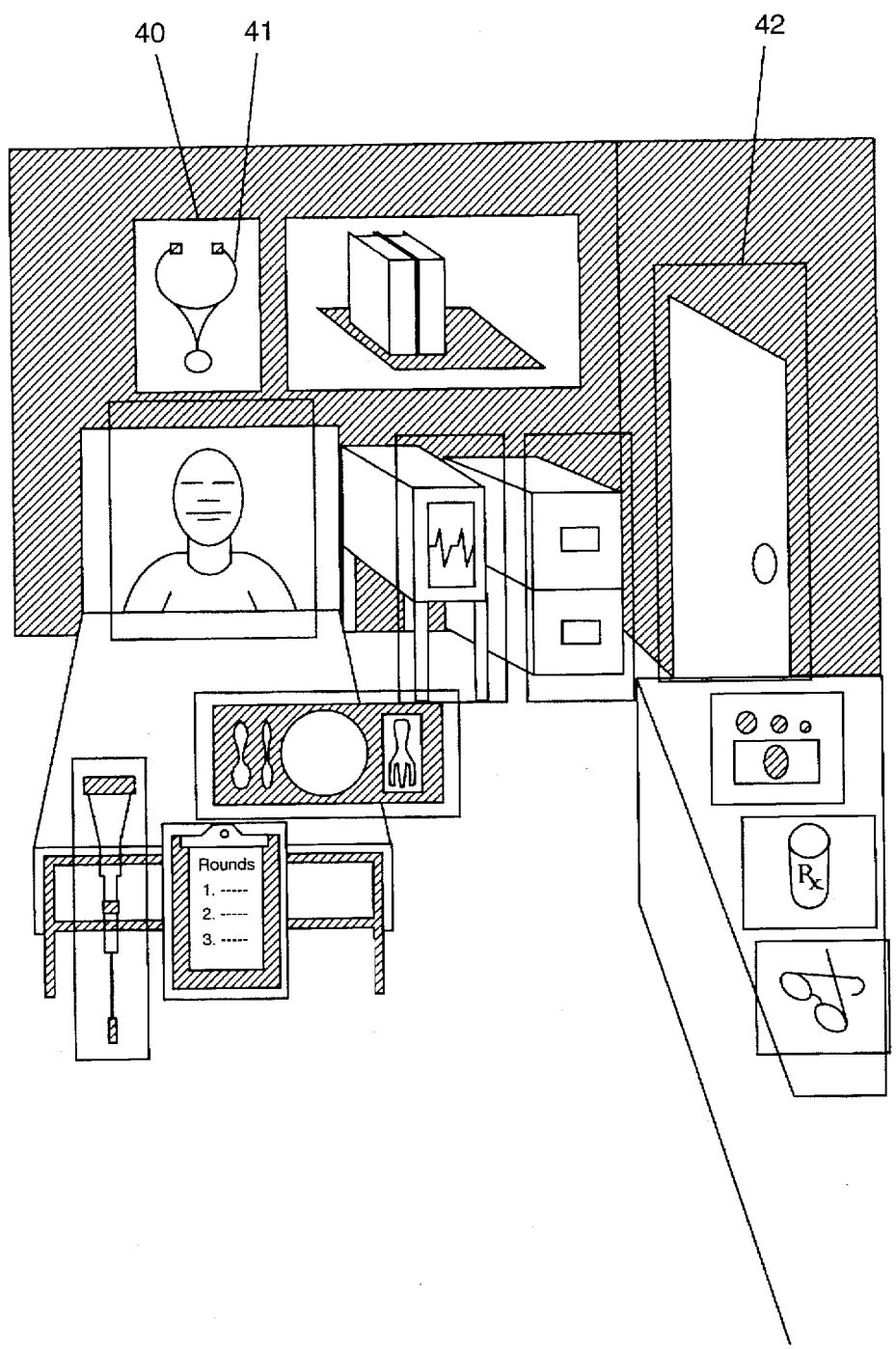
FIG. 5 is an example of a user interface having borders according to the present invention.

FIG. 5 illustrates a first embodiment of the present invention. As seen in FIG. 5 a single picture element wide border 40 surrounds an icon 41 which designates a user selectable option. As will be appreciated by those of skill in the art, a user selectable option may be identified by a graphic icon, a text icon or a combined graphic and text icon. These icons may be of any size and shape and the region of the screen associated with the user selectable option need not be coextensive with the region of the screen occupied by the icon. For example, as illustrated in FIG. 5 the region of the screen within the border 40 associated with the user selectable option identified by the icon 41 is larger than the icon 41.

As described above, for each picture element the color characteristics of that element may include hue, brightness, and saturation. In determining the color characteristic for the border 40 of FIG. 5 the neighboring picture elements to the border are utilized. As used herein, the term neighboring picture elements may correspond to picture elements adjacent to the border and which lie either inside or outside of the border. Neighboring picture elements may also refer to the non-varied picture elements which correspond to the location of the border on the screen. In the last case the neighboring picture elements may be said to lie "under" or "beneath" the border. As seen in FIG. 5 by creating a border which has characteristics which are dependent upon the characteristic of the neighboring picture elements to the border the borders are less obtrusive in the screen and detract less from the three dimensional user interface. Furthermore, the borders are less likely to have drop out as the color characteristics of the borders are based upon the color characteristics of the neighboring pixels.

Figure 6:
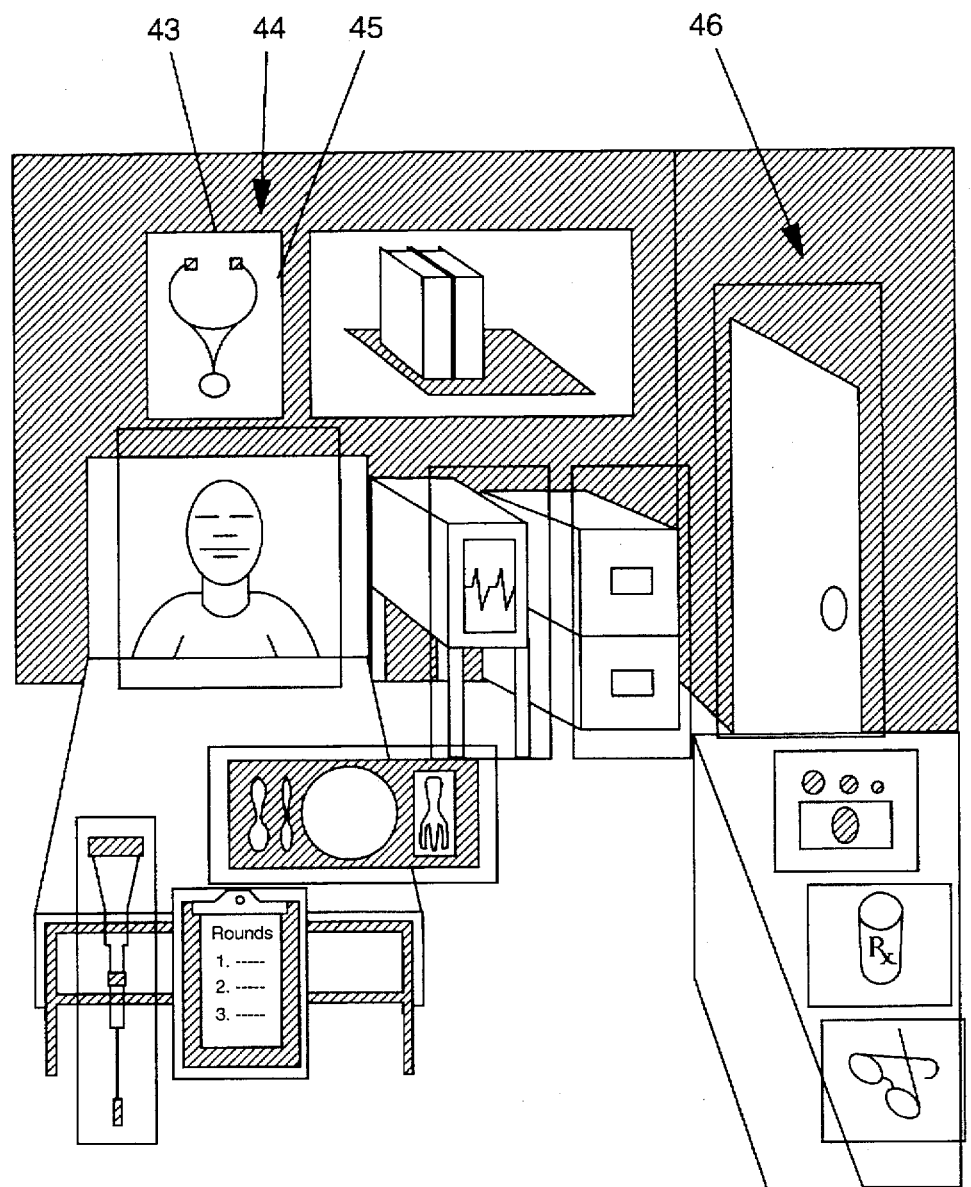
FIG. 6 is a second example of a user interface having borders according to the present invention.

By varying the color characteristics of the picture elements which are neighboring the border 40 to establish the color characteristics of the border a context sensitive or subtle border is created. While any of the color characteristics of the picture elements may be varied to create the border it is preferred that either brightness, saturation or both be varied. Thus, for example, by increasing the saturation value of a picture element the picture element will appear darker. By decreasing the saturation value of a picture element the picture element will appear lighter. Similarly, by decreasing the brightness value of a picture element the picture element will appear darker and by increasing the brightness of a picture element the picture element will appear lighter. FIG. 6 illustrates a further embodiment of the present invention. As seen in FIG. 6 the borders 44 and 46 are two picture elements wide. Border portion 43 has an outer darker border and an inner lighter border while border portion 45 has two borders of darker picture elements. This combination of two wide picture element borders adds to the three dimensional appearance of the borders and may also be utilized to make the borders, and thus the user selectable option associated with the borders, more prominent in the user interface environment. Furthermore, the three dimensional appearance of the borders 44 and 46 is created by creating the appearance that an imaginary light source exists in the upper left hand corner of the screen. To make the region of the screen appear as if it is raised from its surrounding background the borders on the upper and left sides of the region are made lighter than the neighboring picture elements and the borders on the lower and right hand sides of the region are made darker than the neighboring picture elements. This selection of variation in the neighboring picture elements simulates light incident on a surface defined by the first border section 43 and simulates a surface defined by the second border section 45 appearing in a shadow. Thus, by providing a first border section 43 comprised of picture elements circumscribing less than the total perimeter of the user selectable option, wherein color characteristics of picture elements of the first border section 43 are selected to simulate light incident on a surface defined by the first border section and by providing a second border section 45 comprised of picture elements circumscribing less than the total perimeter of the user selectable option, wherein the characteristics of picture elements of the second border section are selected to simulate a surface defined by the second border section 45 appearing in a shadow the first and second border sections make the user selectable option appear three dimensional. By reversing the variation in the two border sections the user selectable option appears as a depression in the surrounding background. This manipulation of the variation of the border sections may be utilized, for example, to indicate when a user selectable option is selected and when it is de-selected.

The present invention will now be described with respect to FIGS. 7 through 14 which illustrate a single user selectable option within a user interface environment.

Figure 7:
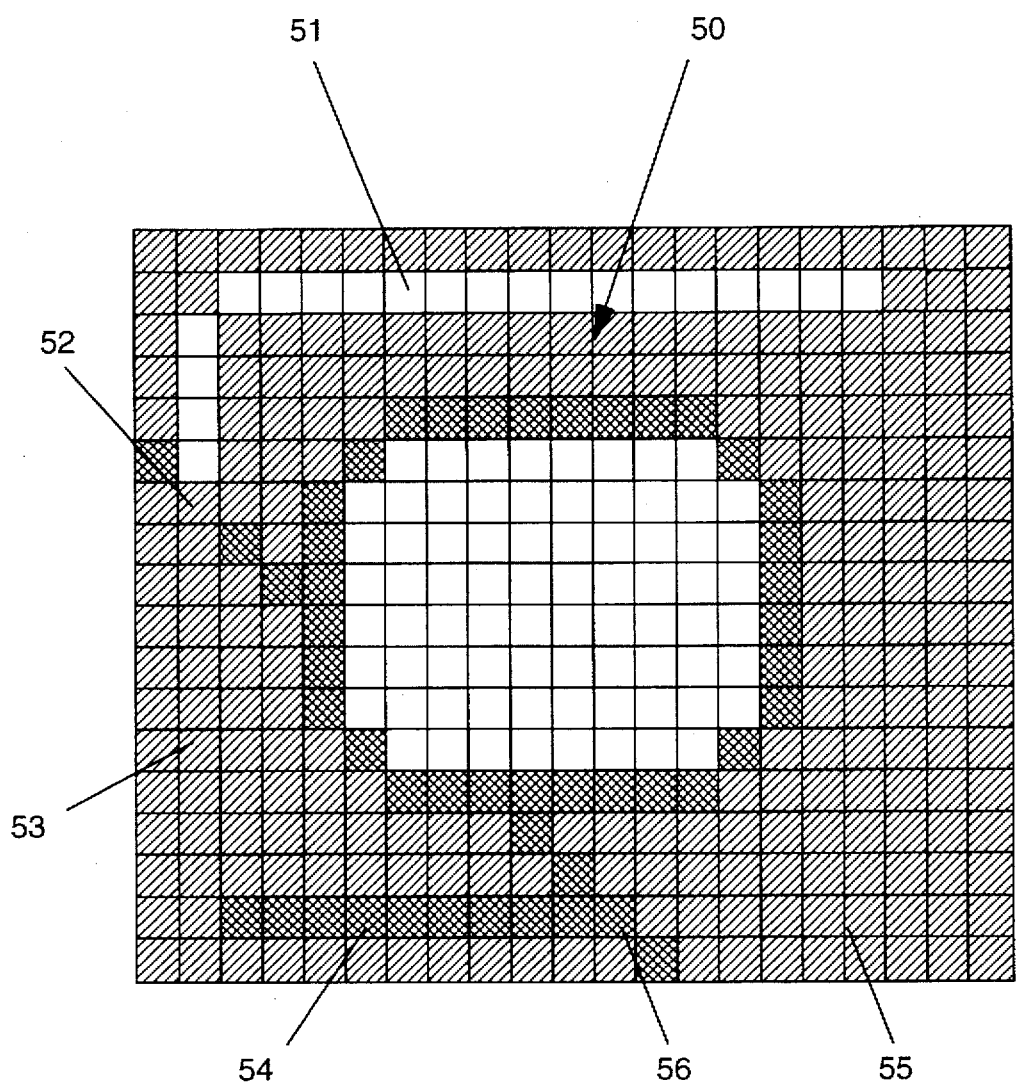
FIG. 7 is a close-up of a single picture element wide border according to the present invention wherein the border elements are varied based on the underlying picture elements and appear as if the border is raised from the background.

FIG. 7 is a close-up view of a border according to the present invention. An icon 50 is illustrated in FIG. 7 which represents a user selectable option. For example, icon 50 may represent an application corresponding to the displayed icon. A border has been drawn around the user selectable icon 50 to designate the portion of the screen where selection by pointing device would result in either selection or de-selection of the user selectable option. The border includes a plurality of picture elements which circumscribe the icon 50. As illustrated in FIG. 7 the color characteristics of the border elements 51, 52, 53, 54, 55, and 56 are selected by varying the color characteristics of the picture elements underneath the border. Thus, the light grey shaded picture elements of the border section 51 have been varied to white border segments. The black picture element value at 52 has been varied to dark grey and the dark grey picture elements beneath border segment 53 have been varied to light grey. As described above, the first border section is drawn to simulate light incident upon the surface beneath the border. This is accomplished by varying the color characteristics beneath the border section to appear lighter than the underlying picture element color characteristics. Similarly, a second border section is created to appear as if the surface beneath the border section were in the shadow. This is accomplished by varying the color characteristics of the picture elements which lie beneath the border section to darker shades. Thus, for example, the picture elements of the border section 54 have had the dark grey color characteristics varied to black.

As an illustration of one aspect of the present invention, the picture element of the border section 56 first began as black and lies on a side of the border which should have the color characteristics of the underlying picture elements darkened to simulate a shadow. However, because the picture element 56 is already at the darkest level the picture element 56 cannot have its color characteristics made any darker. This illustrates one aspect of the present invention where possible colors for the background sections of the user interface should be limited to slightly less than the darkest or lightest color characteristics available. In the present example where four levels of grey are utilized in the user interface the user interface would be limited to two shades of grey, however, in a more realistic setting where hundreds or even millions of colors or levels of grey are available for use in the user interface such a restriction would present few if any difficulties.

Finally with respect to FIG. 7, the border section 55 has had the light grey color characteristics made darker to the dark grey color characteristics. This second border section completes the border around the icon 50 such that it appears three dimensional and appears as if it is raised from the background.

Figure 8:
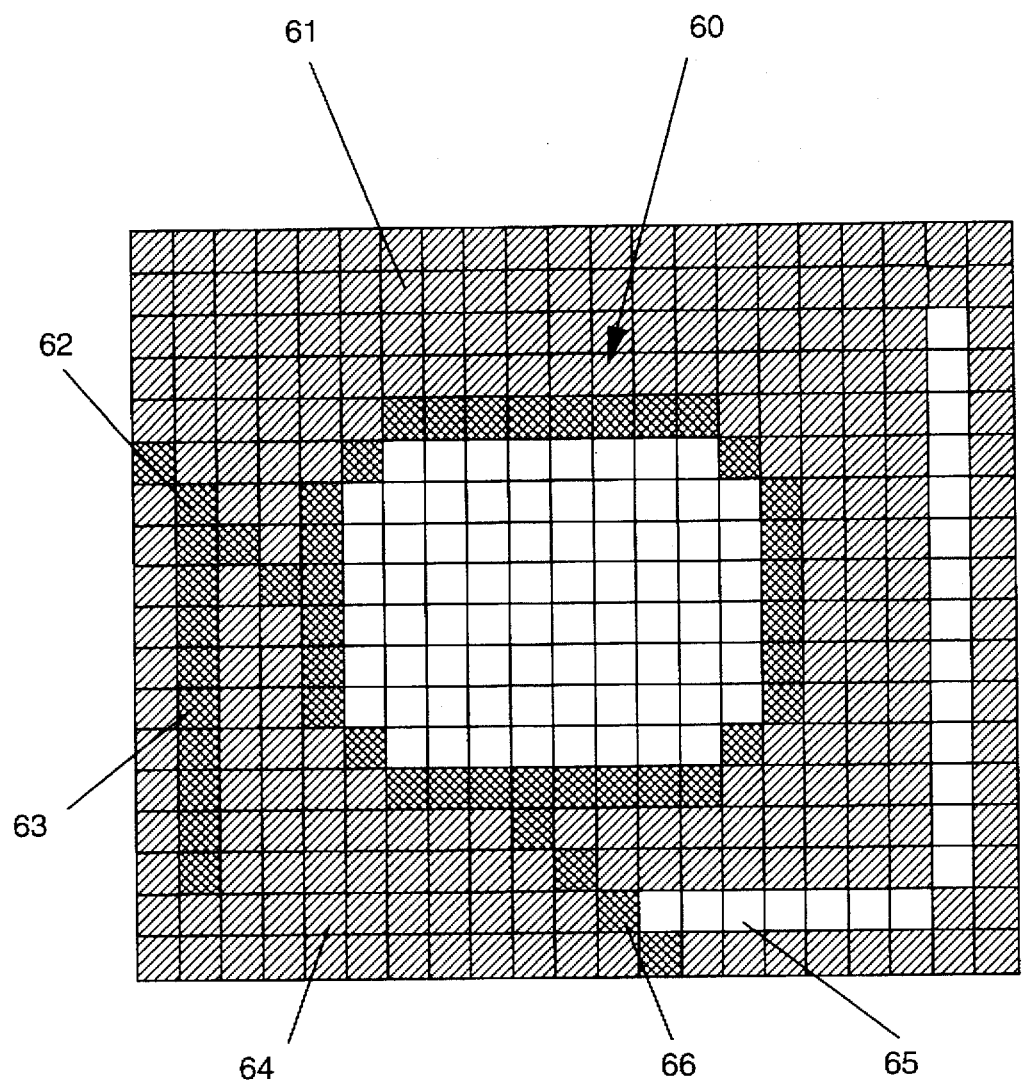
FIG. 8 is a close-up of a single picture element wide border according to the present invention wherein the border elements are varied based on the underlying picture elements and appear as if the border is depressed into the background.

FIG. 8 illustrates the opposite effect achieved by the borders of FIG. 7. The borders of FIG. 8 create the impression that the icon 60 is depressed within the background.

This appearance is created by reversing the variance between the underlying picture elements and the border color characteristics from that illustrated in FIG. 7. Thus, a border section 61 has varied the light grey color characteristics to create a dark grey border section. The border section 62 and border section 63 have varied the underlying color characteristics of the picture elements to create the black border sections. The border section 64 has varied the dark grey color characteristics of the underlying picture elements to create the light grey border section. The border section 66 has varied the black underlying color characteristics to create the dark grey border section and finally the border section 65 has varied the light grey underlying color characteristics to create the white border section. As the border sections of FIG. 8 are opposite that shown in FIG. 7, they give the appearance that the icon 60 is set within a recess within the background section. As described above, this appearance is generated by the assumption that a light source exists in the upper left hand portion of the screen. Thus, a lighter border on the upper and left hand sides of a border combined with a darker border on the lower and right hand sides of the border gives the impression that the border are raised surfaces above the background. Likewise, a darker border in the upper and left hand sides of the border and a lighter border on the lower and right hand sides of the border gives the appearance of an impression or depression within the background.

Figure 9:
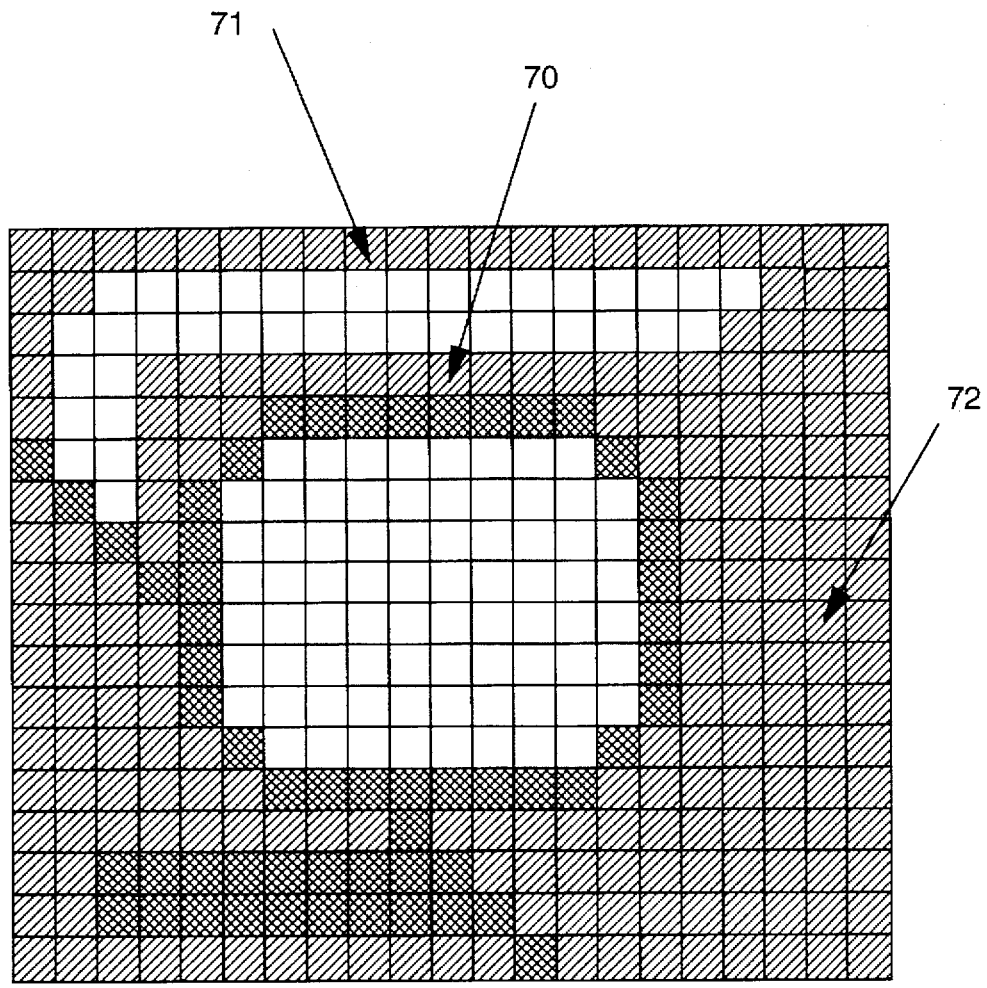
FIG. 9 is a close-up of a two picture element wide border according to the present invention wherein the border elements are varied based on the underlying picture elements and appear as if the border is raised from the background.
Figure 10:
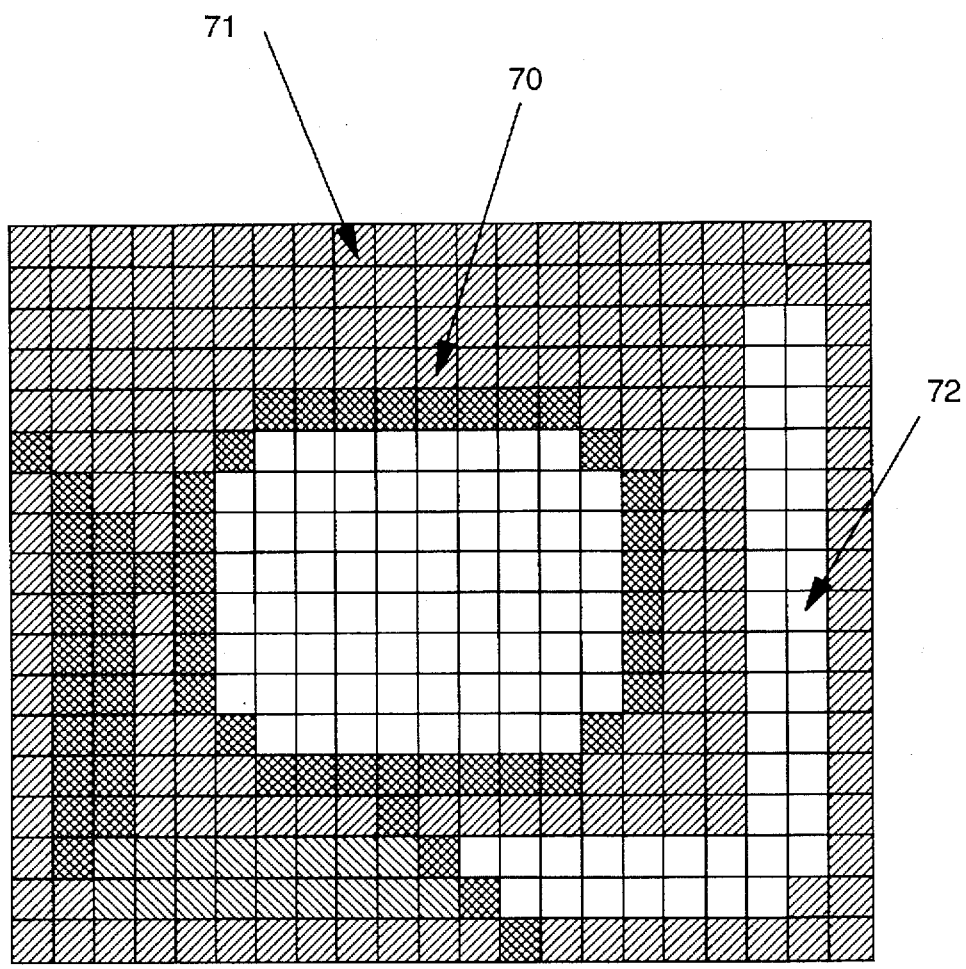
FIG. 10 is a close-up of a two picture element wide border according to the present invention wherein the border elements are varied based on the underlying picture elements and appear as if the border is depressed into the background.

FIGS. 9 and 10 illustrate a two picture element wide embodiment of the present invention. In FIG. 9 the borders section 71 being on the upper and left hand side of the icon 70 and the border section 72 being on the lower and right hand side of the icon 70 give the impression that the icon 70 is on an elevated surface above the background. Likewise, in FIG. 10 the border section 71 being darker and on the upper and left hand side of the icon 70 and the border section 72 being lighter and on the lower and right hand side of icon 70 give the impression that the icon 70 is on a surface which is depressed below the background. The two picture element wide borders of FIGS. 9 and 10 further emphasize the region of the screen associated with the user selectable option and thereby make it more prominent to the user.

Figure 11:
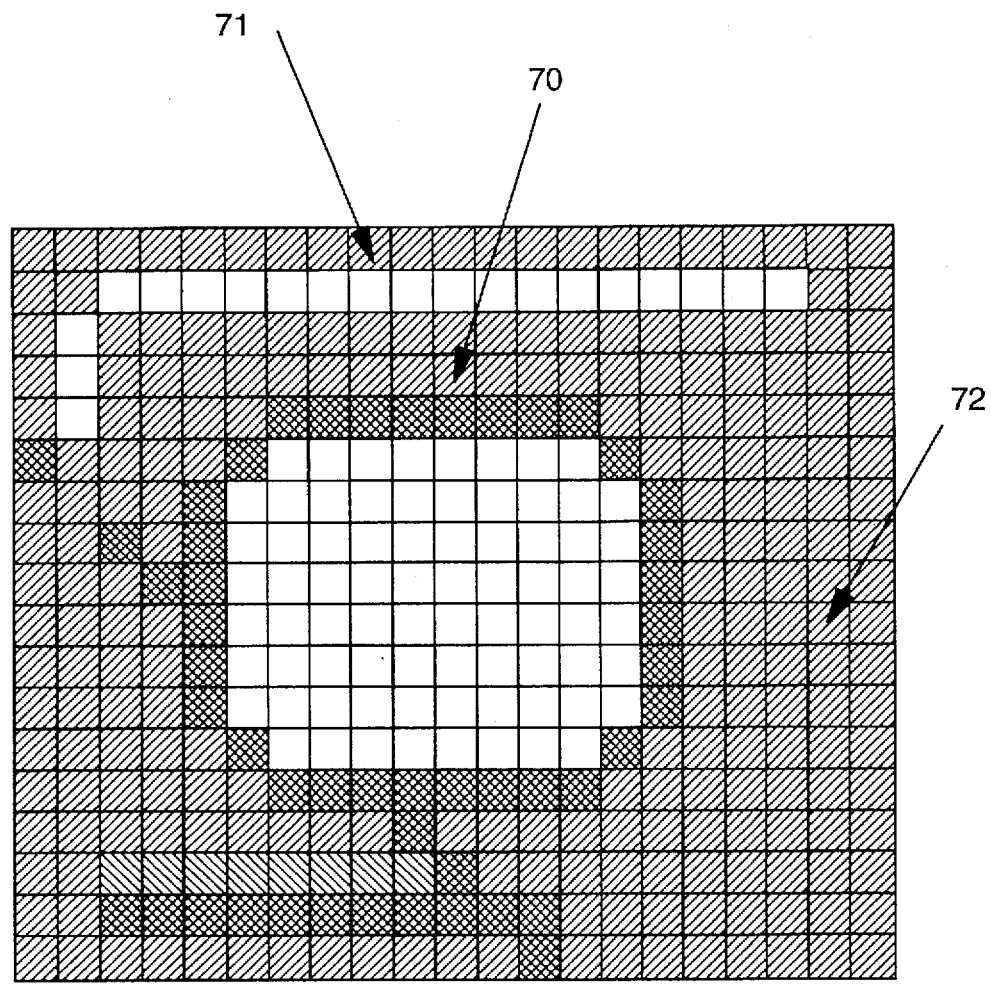
FIG. 11 is a close-up of a single picture element wide border according to the present invention wherein the border elements are varied based on the picture elements adjacent the border and appear as if the border is raised from the background.
Figure 12:
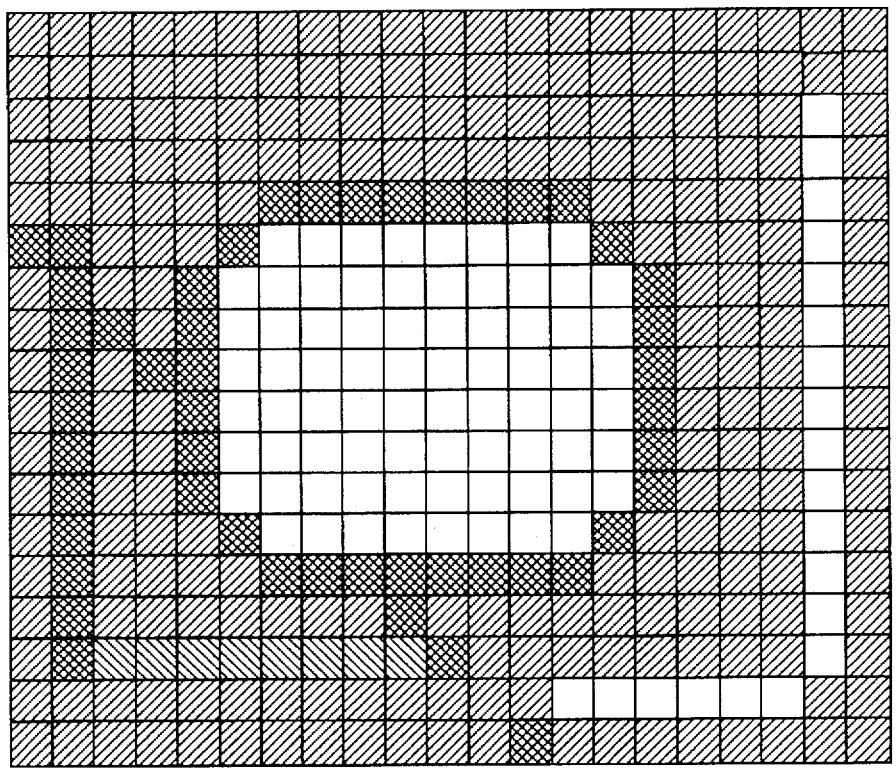
FIG. 12 is a close-up of a single picture element wide border according to the present invention wherein the border elements are varied based on the picture elements adjacent the border and appear as if the border is depressed into the background.
Figure 13:
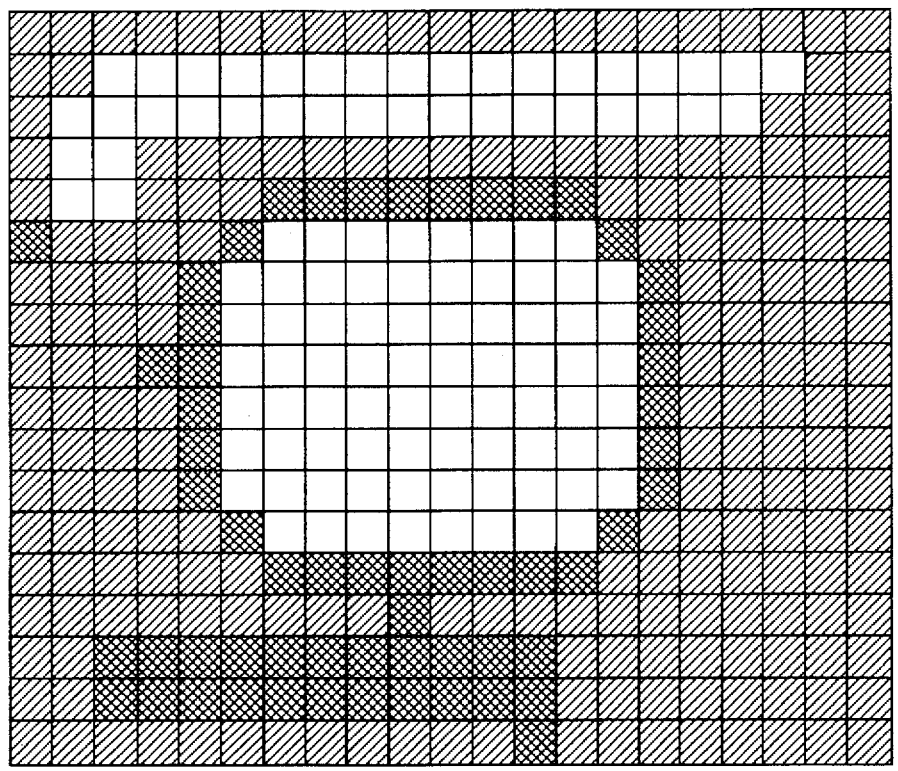
FIG. 13 is a close-up of a two picture element wide border according to the present invention wherein the border elements are varied based on the picture elements adjacent the border and appear as if the border is raised from the background.
Figure 14:
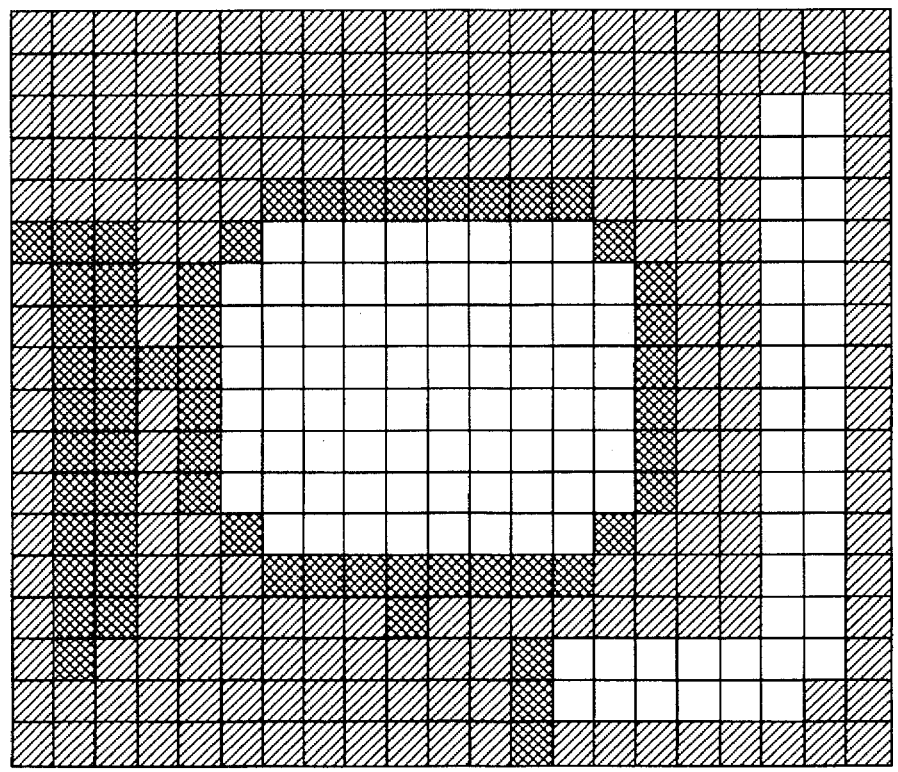
FIG. 14 is a close-up of a two picture element wide border according to the present invention wherein the border elements are varied based on the picture elements adjacent the border and appear as if the border is depressed into the background.

FIGS. 11, 12, 13 and 14 illustrate an alternative embodiment of the present invention where the color characteristics of the border are based upon the color characteristics of the picture elements adjacent the border and outside the border rather than underlying the border. Thus, FIG. 11 illustrates a border around an icon which is to have the appearance of being elevated above the background surface and corresponds to the border FIG. 7. FIG. 12 illustrates a border which gives the appearance that the icon is in a recess below the background and corresponds to FIG. 8. FIG. 13 corresponds to FIG. 9 and illustrates a two pixel element wide border which gives the appearance that the icon is above the background. And finally FIG. 14 is a two picture element wide border which corresponds to FIG. 10 and gives the impression that the icon is in a recess below the level of the background.

As will be appreciated by those of skill in the art with the review of FIGS. 7 through 14, the preferred method of the present invention is to utilize the color characteristics of the picture elements which underlie the border. However, in certain situations other neighboring picture elements such as adjacent picture elements may be easier for the computing system to interpret or access. The underlying picture elements may not even be accessible. Furthermore, while the borders of the present invention have been illustrated as circumscribing an icon about a path which differs from the perimeter of the icon, the present invention may also be utilized if the borders follow the path of the perimeter of the icon. Also, the borders of the present invention may be utilized with the buttons described above which have a fixed border color independent of the context of the border.

Figure 15:
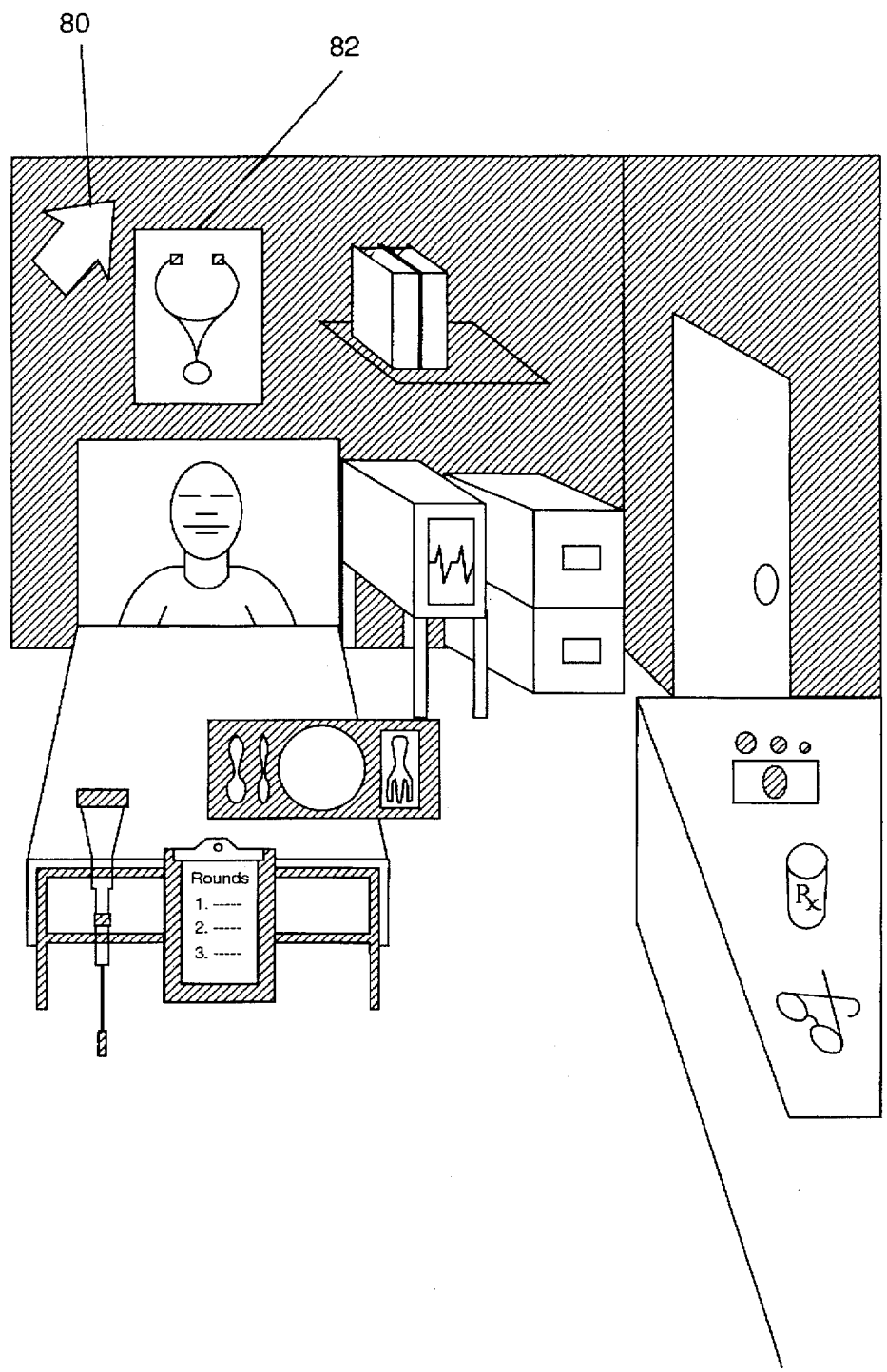
FIG. 15 is an example of a user interface wherein borders to user selectable options are activated based on the location pointed to by a pointing device.
Figure 16:
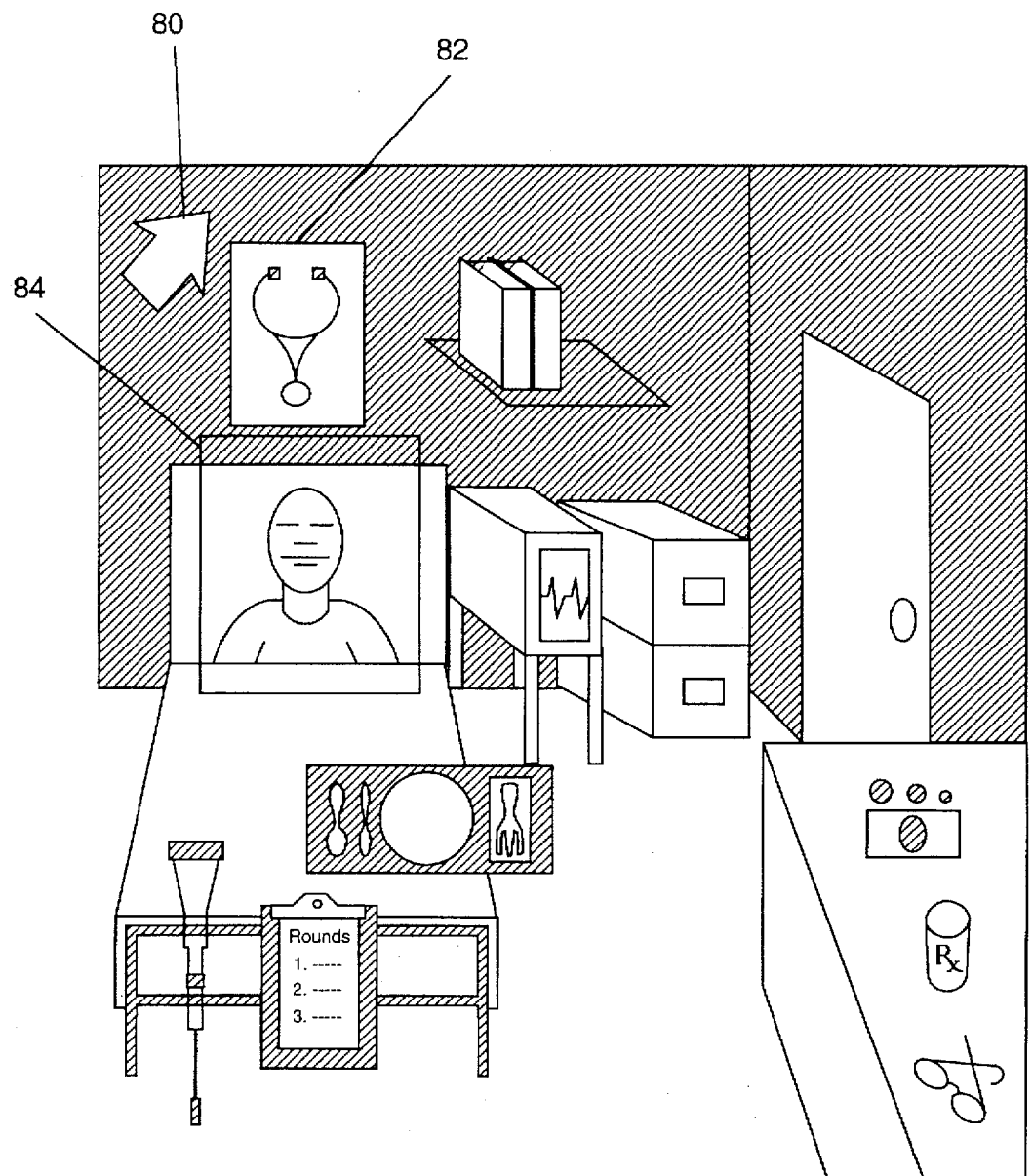
FIG. 16 is a second example of a user interface wherein borders to user selectable options are activated and made more or less prominent based on the location pointed to by a pointing device.
Figure 1:
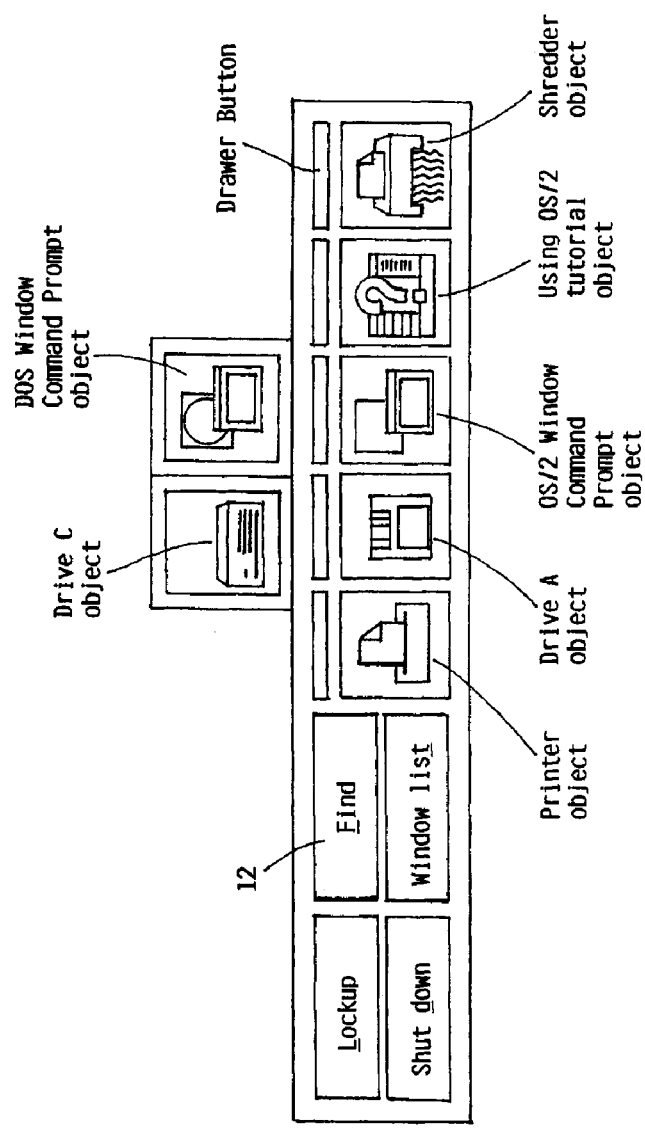
Figure 2:
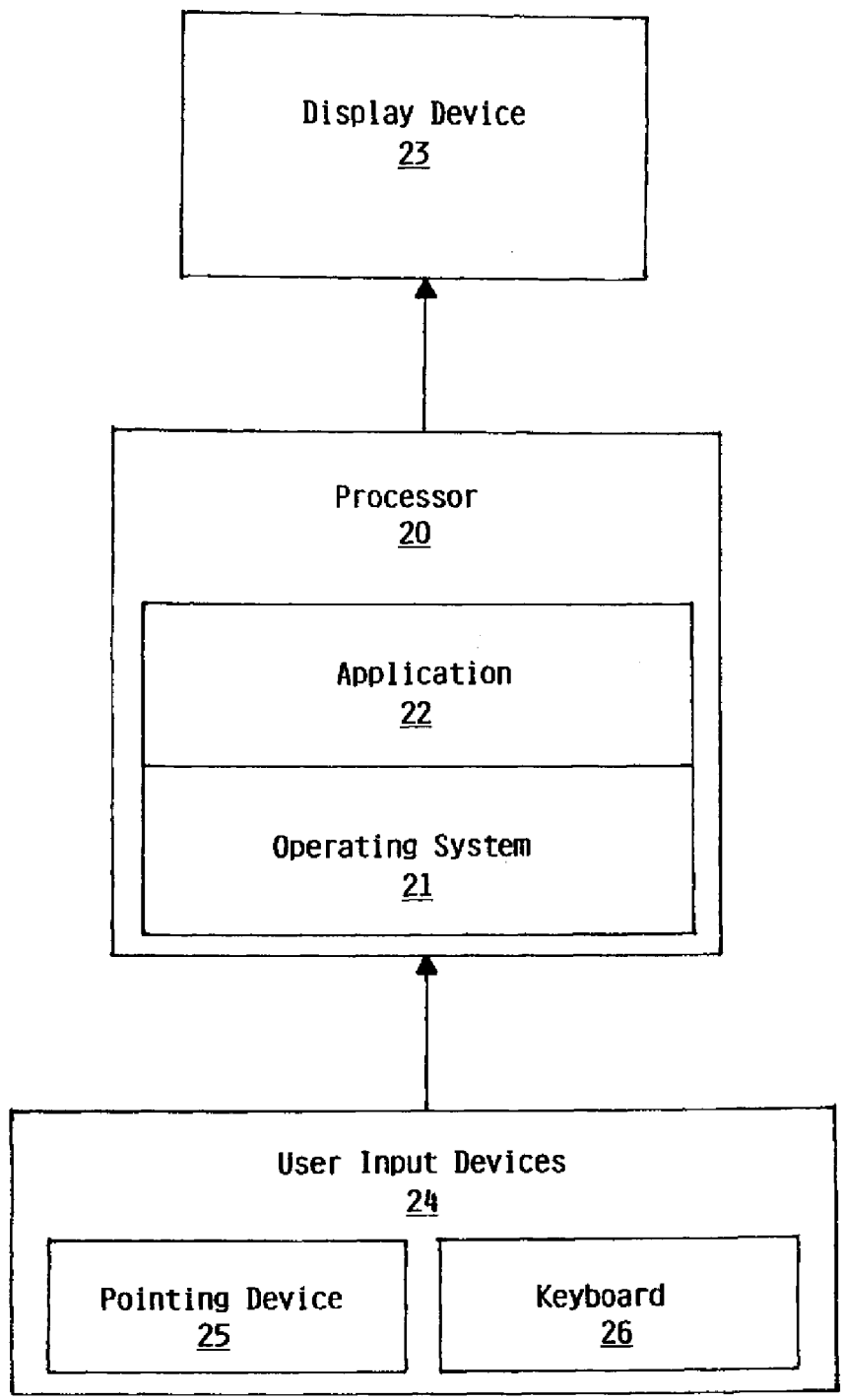
Figure 3:
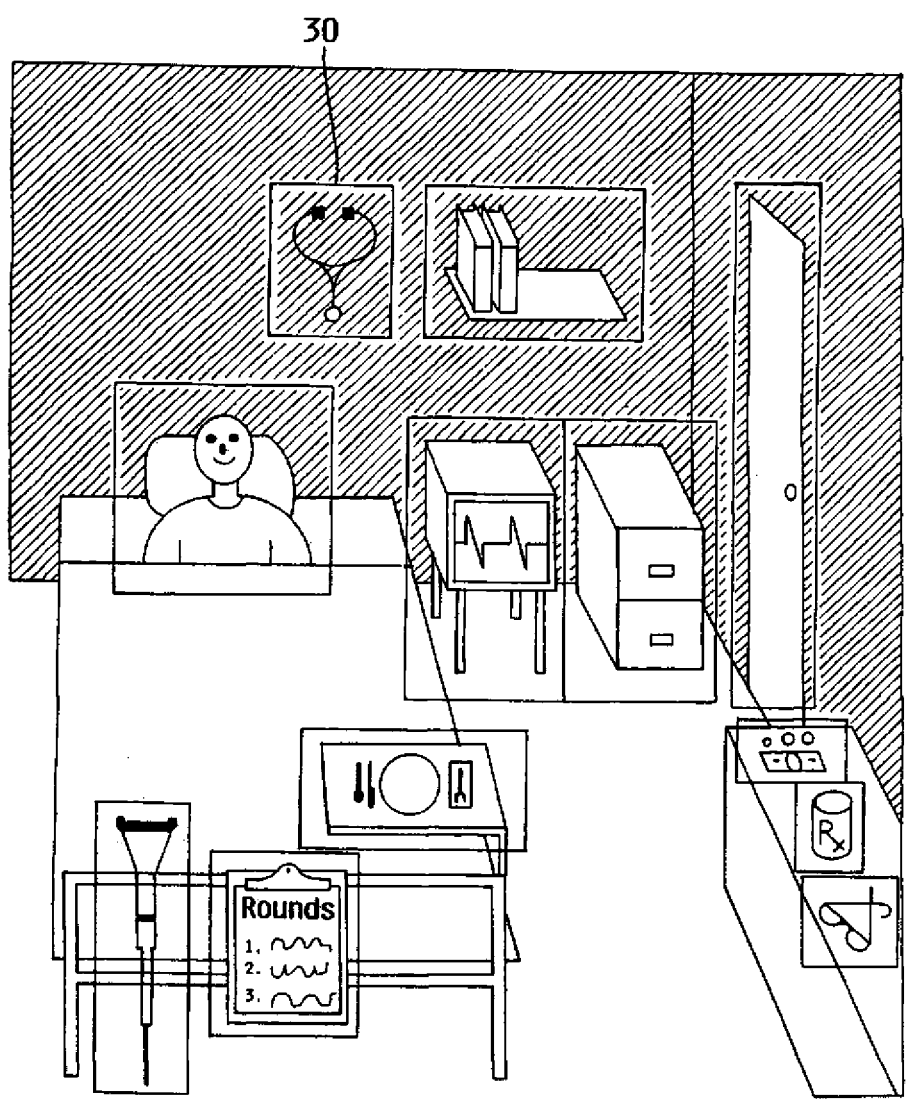
Figure 4:
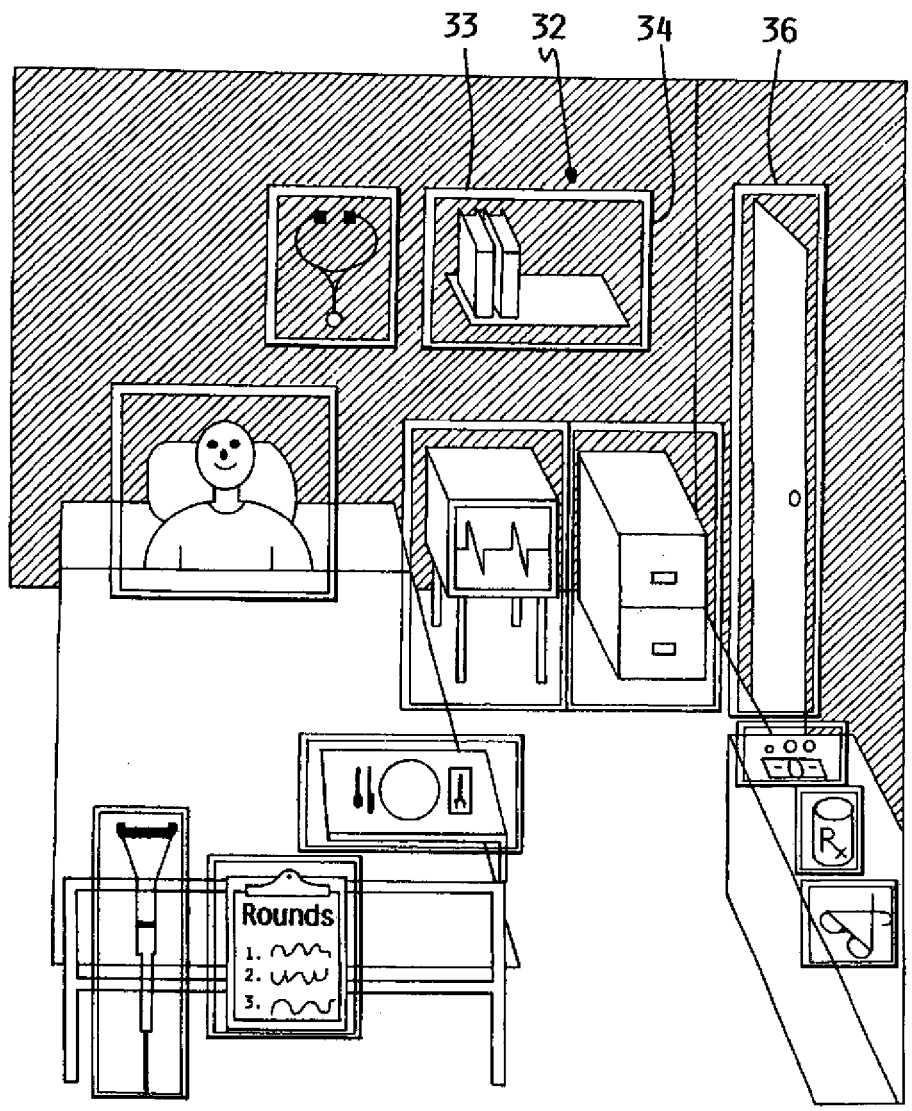
Figure 5:
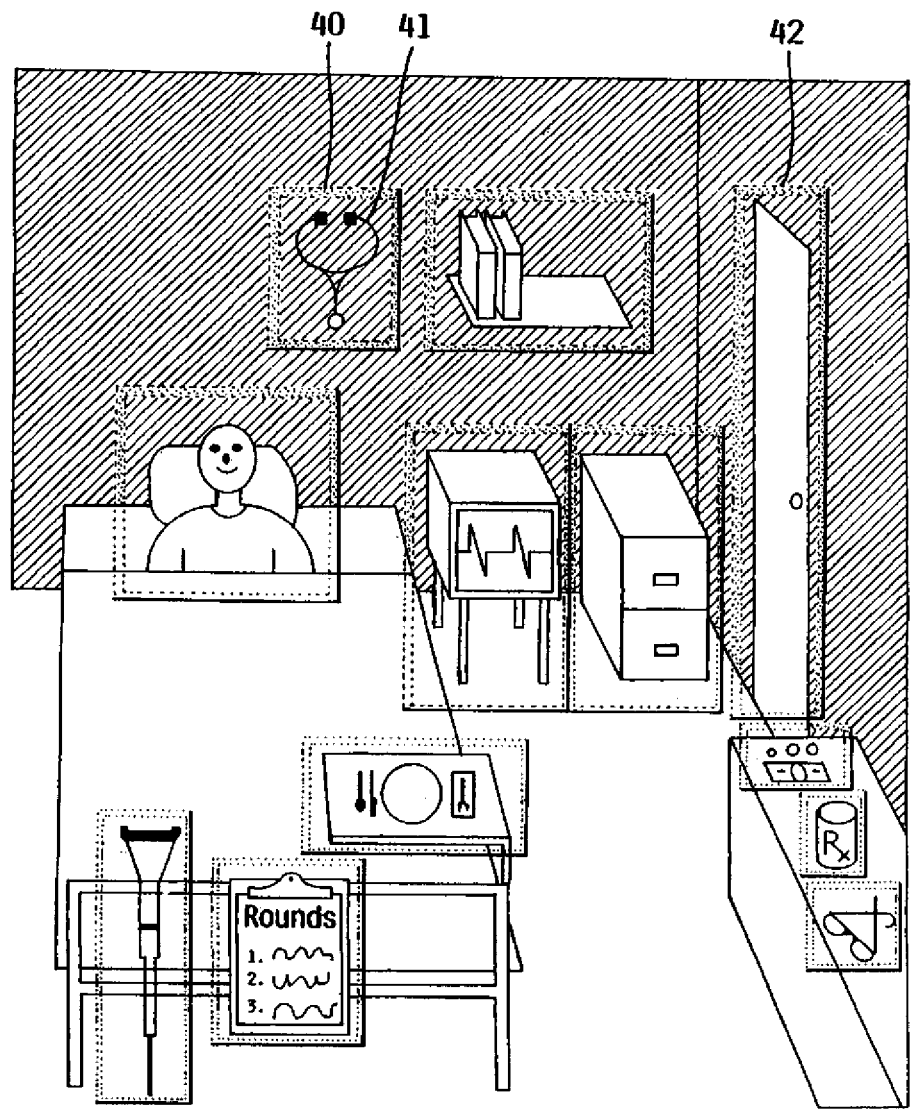
Figure 6:
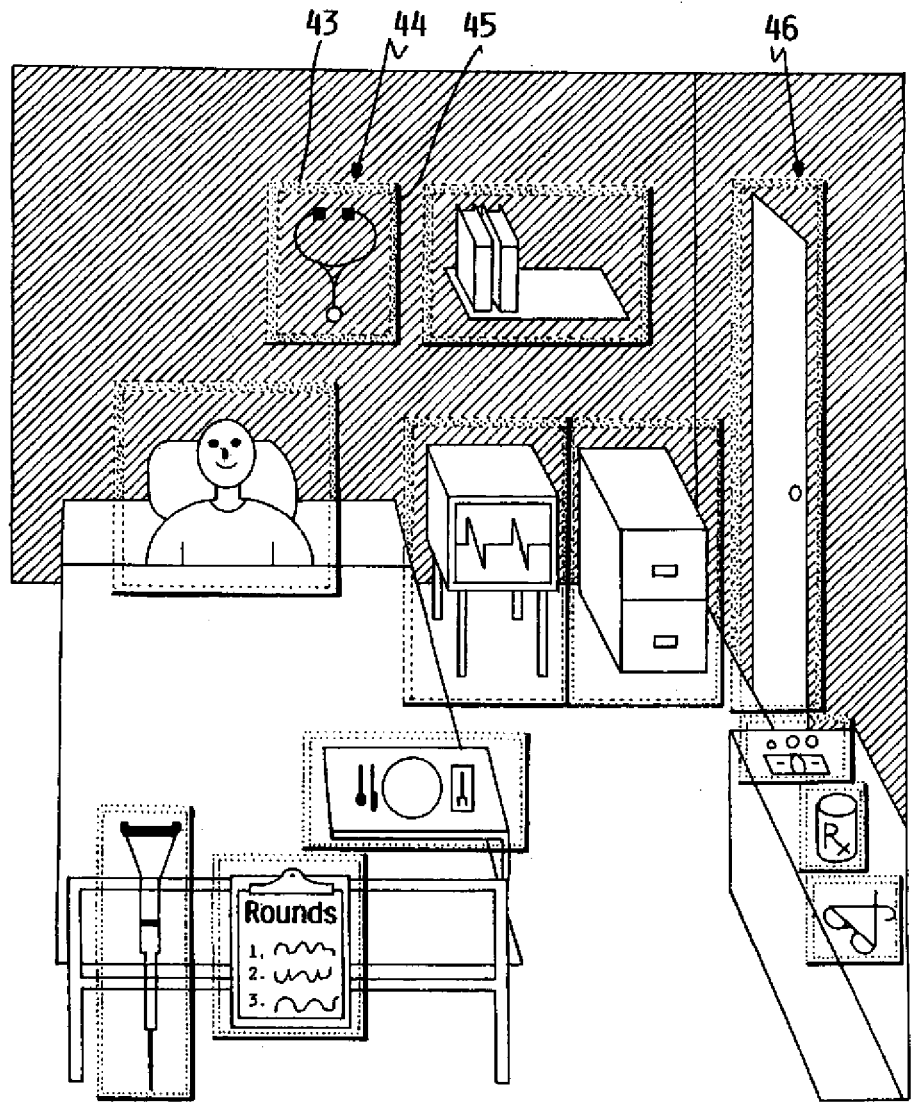
Figure 7:
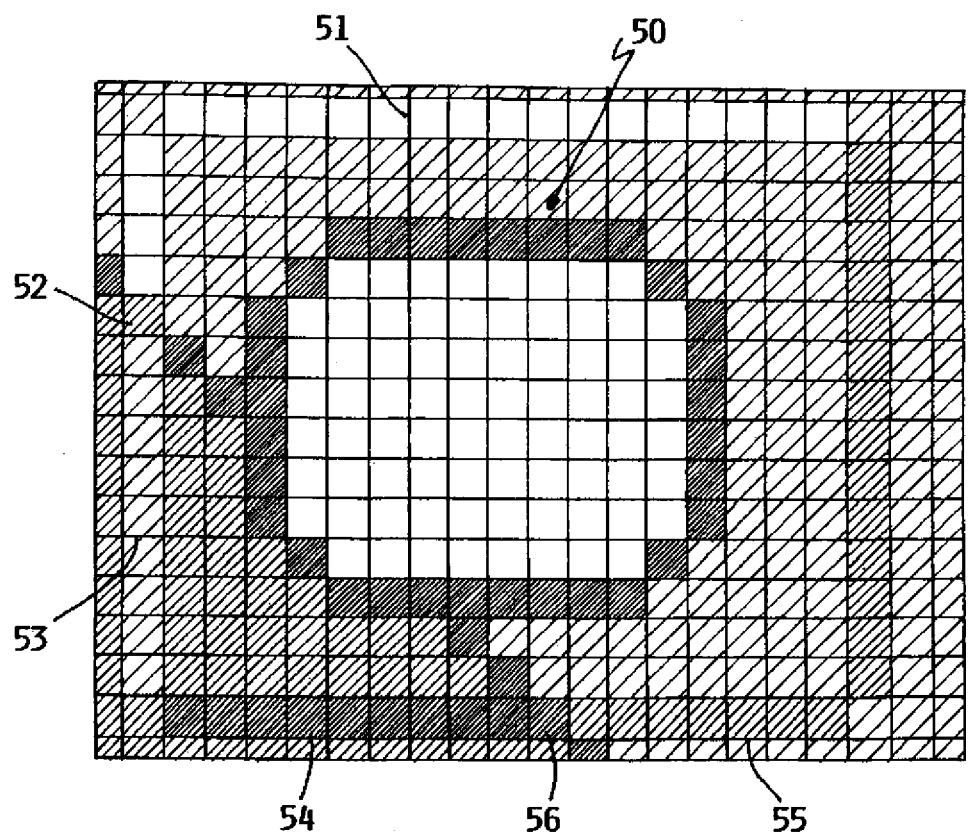
Figure 8:
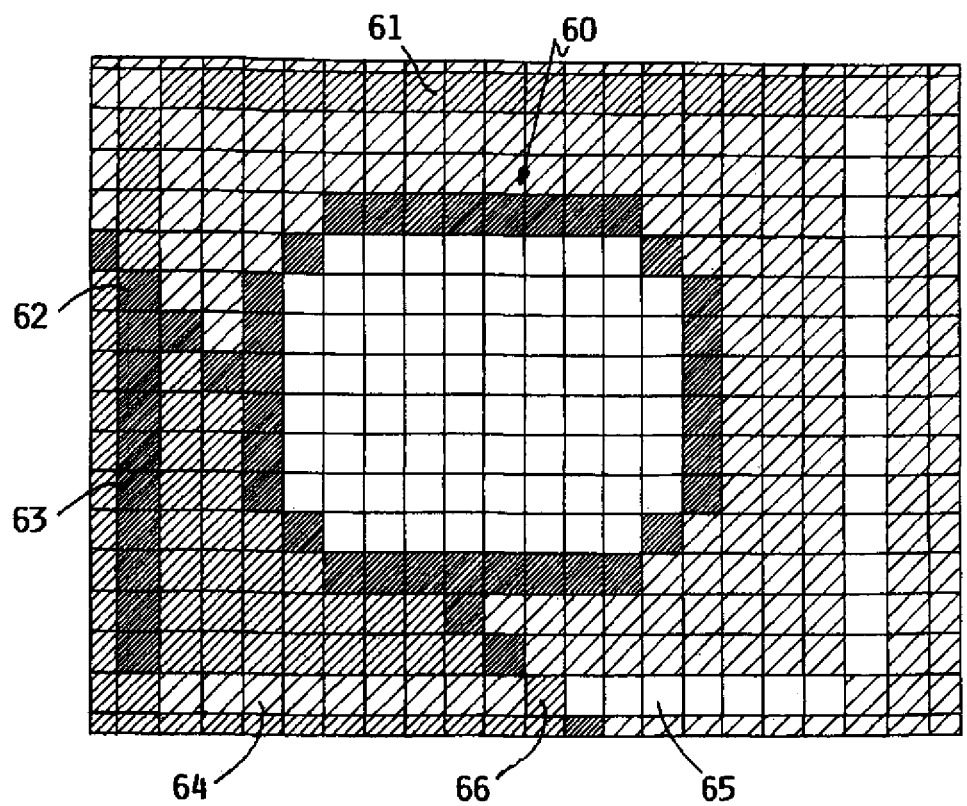
Figure 9:
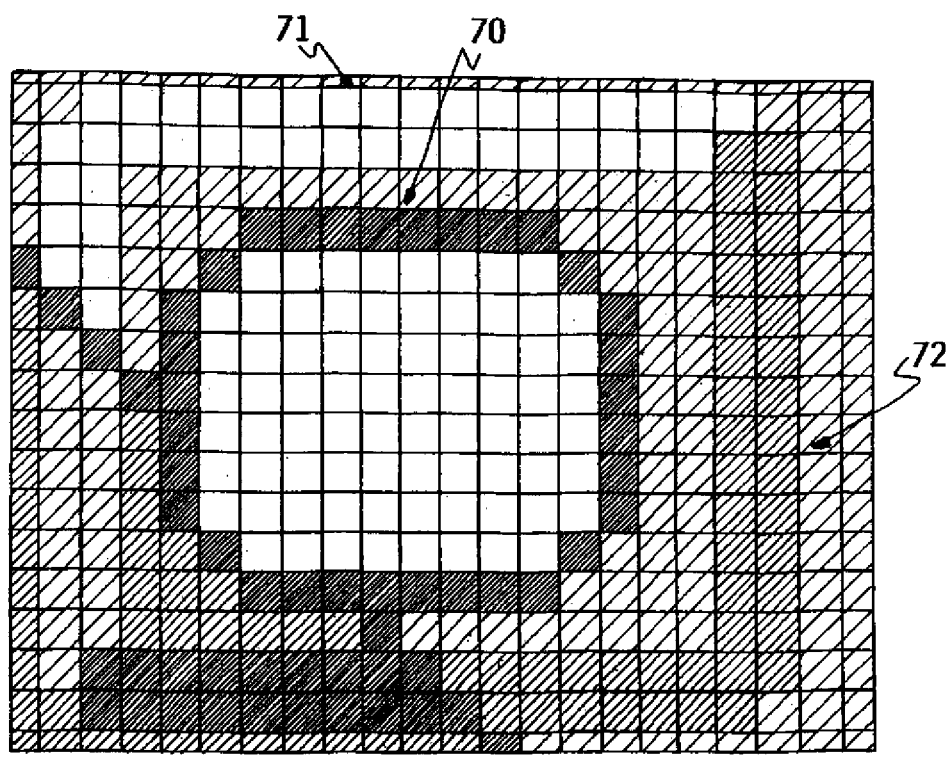
Figure 10:
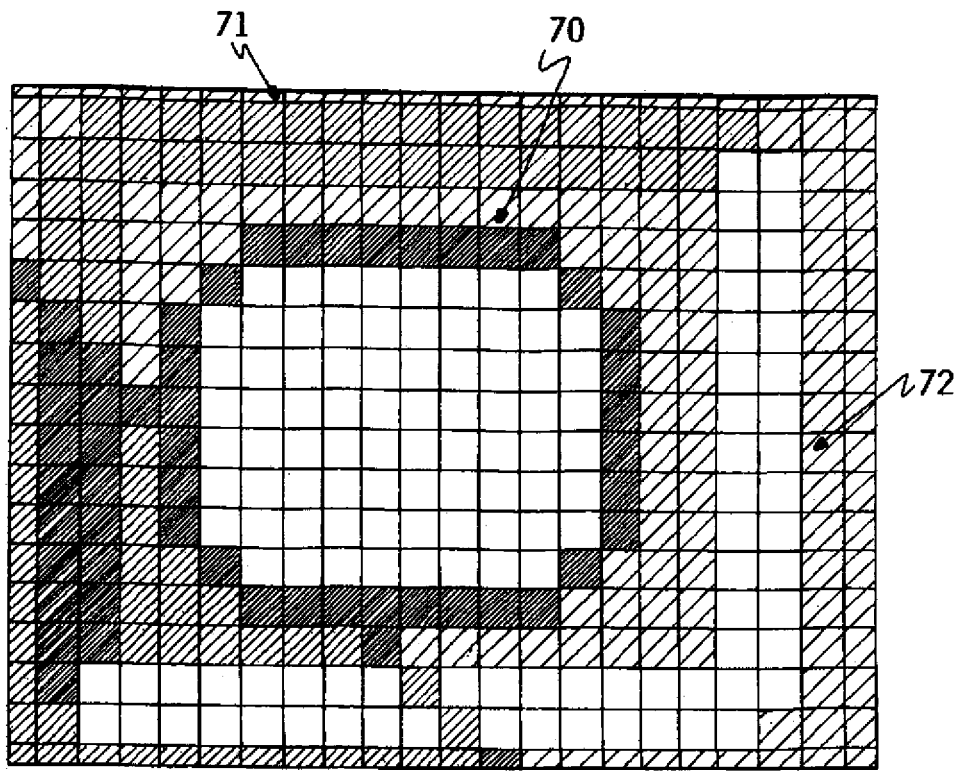
Figure 11:
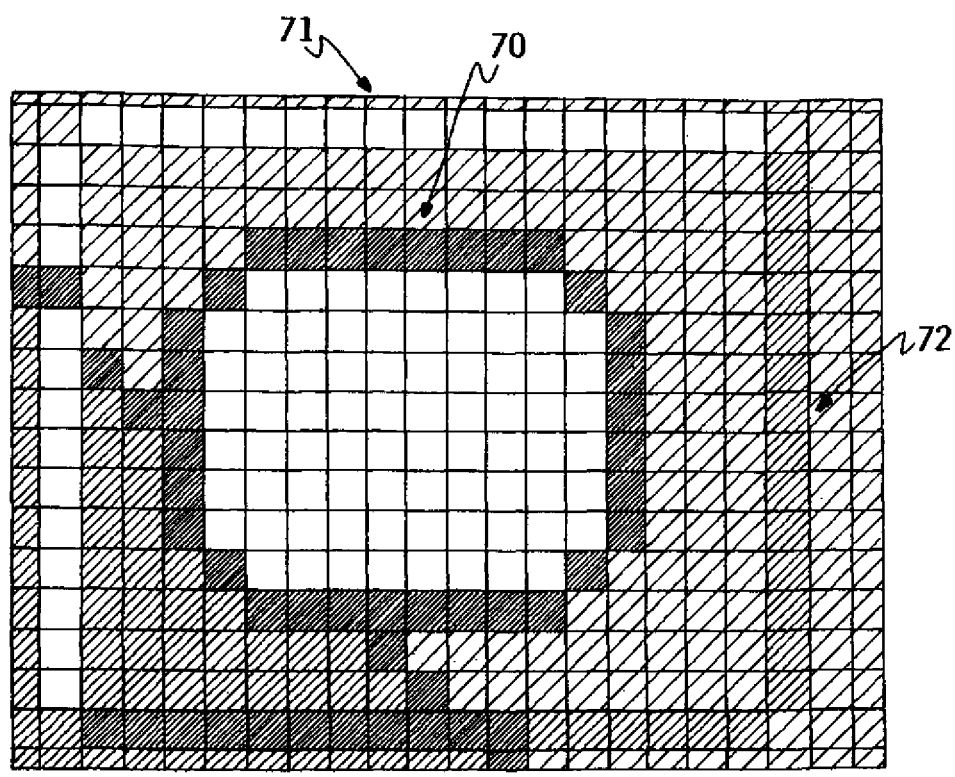
Figure 12:
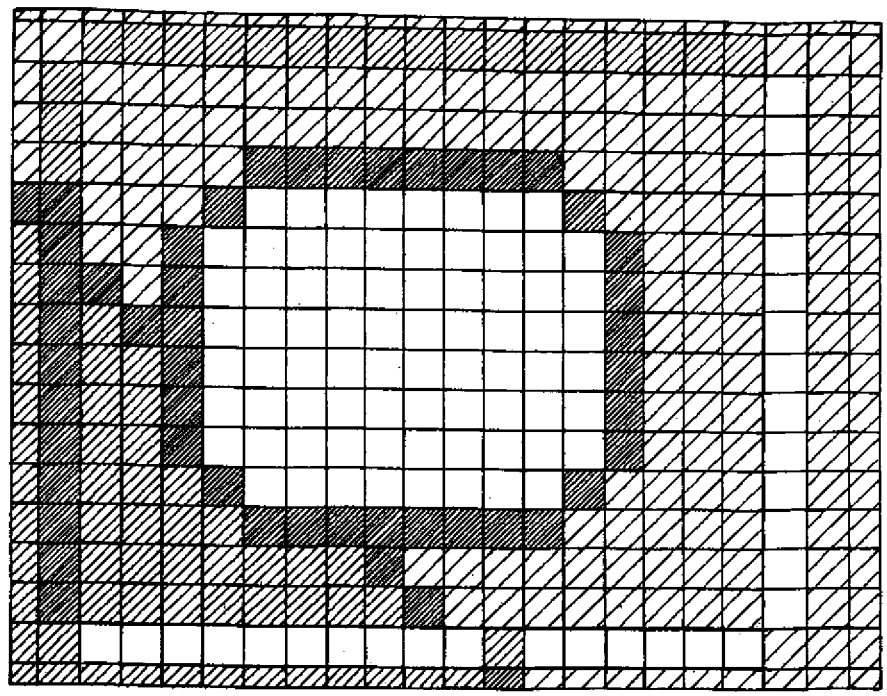
Figure 13:
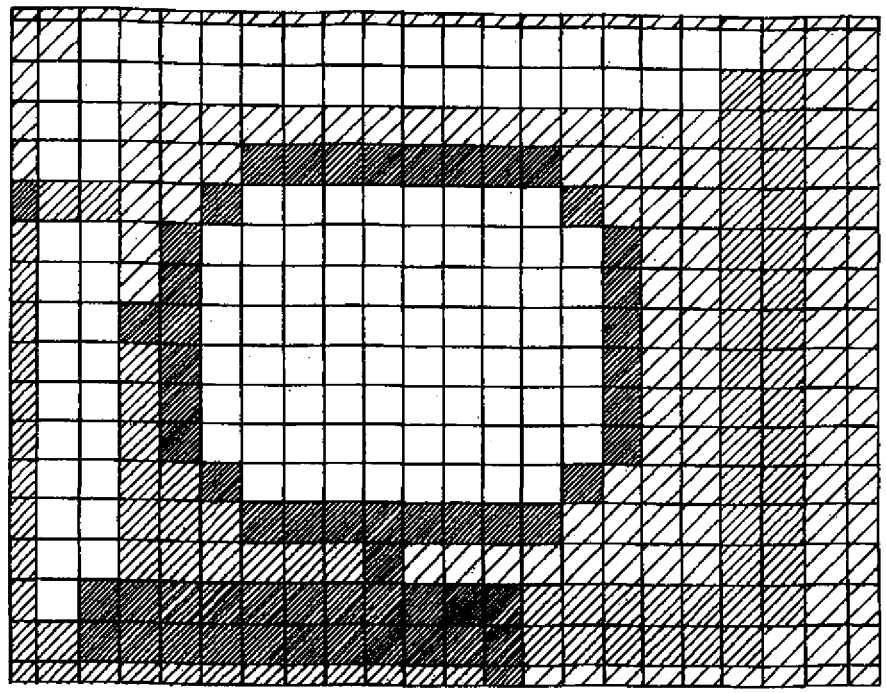
Figure 14:
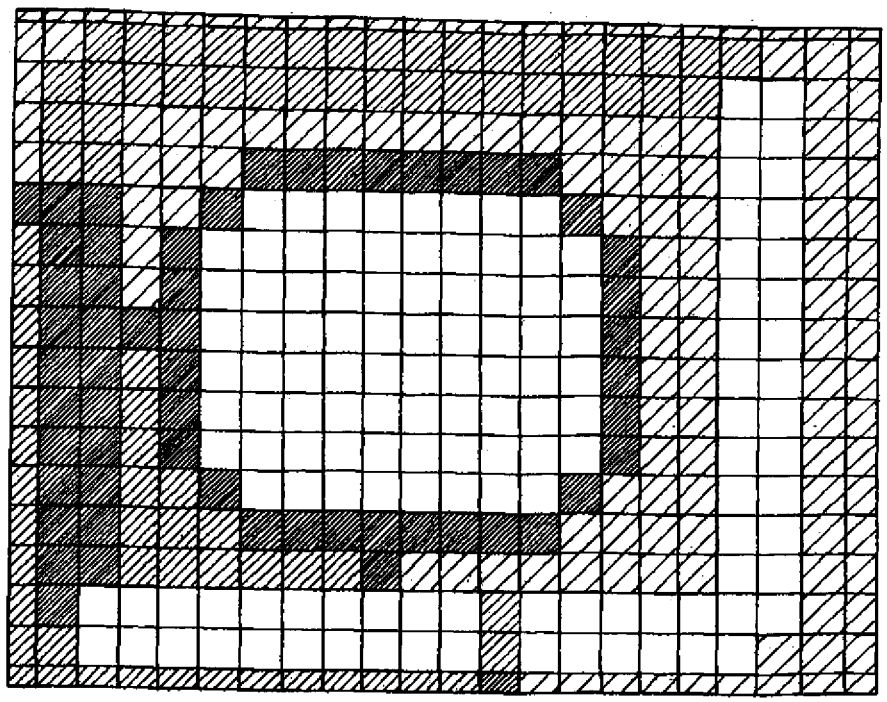
Figure 15:
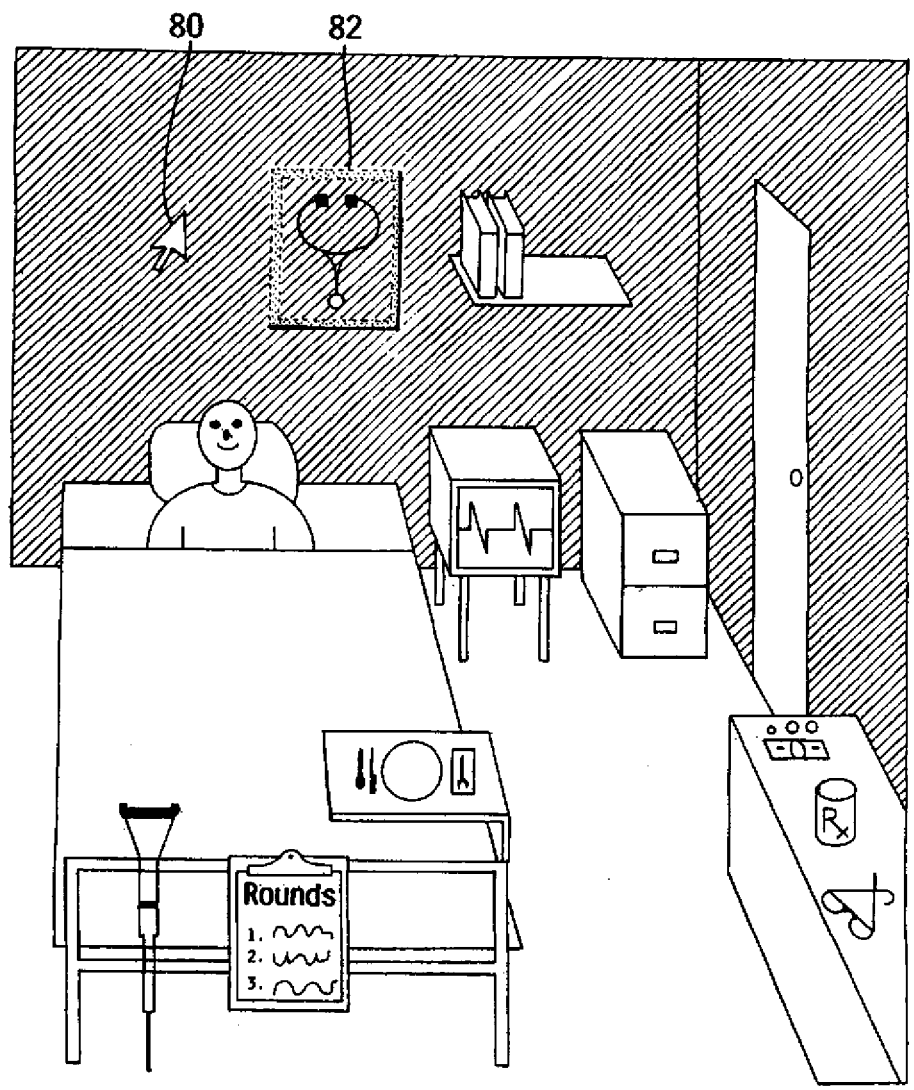
Figure 16:
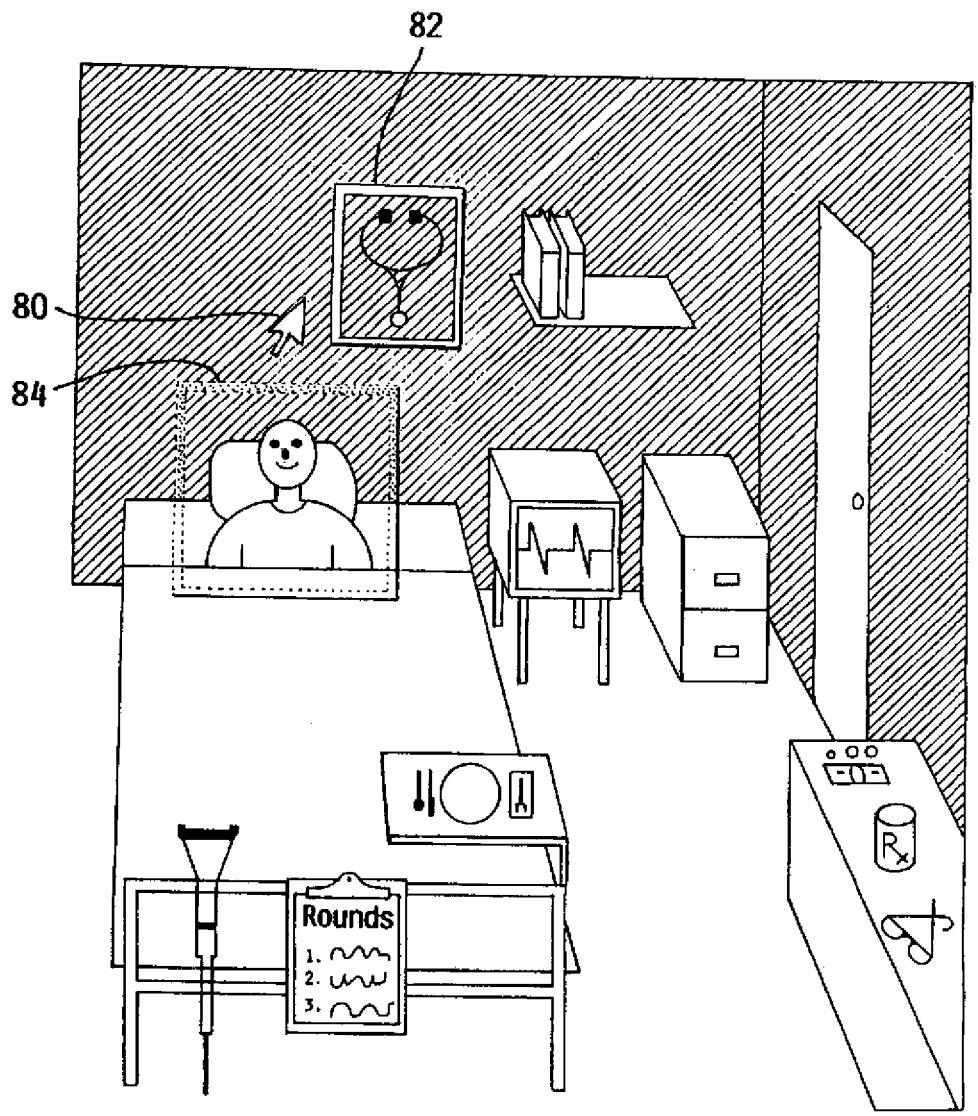

FIGS. 15 and 16 illustrates a further embodiment of the present invention where the prominence of a border for a user selectable option is varied based upon user input. As illustrated in FIGS. 15 and 16, the user input is the result of movement of a pointing device which controls the location on the screen of a pointing device icon 80. As seen in FIG. 15, border 82 is created based upon the proximity of the pointing device icon 82 to the region of the screen circumscribed by border 82 and associated with a user selectable option. FIG. 16 illustrates that as the pointing device and, therefore, the pointing device icon 80 is moved to indicate a location of the screen closer to the region of the screen circumscribed by border 82 that border 82 becomes more prominent in the screen. The increased prominence of border 82 illustrated in FIG. 16 may be accomplished by increasing the variance of the border color characteristics from the underlying color characteristics of the border picture elements. Other methods of increasing the prominence of a border such as increasing the width or thickness of the border may also be utilized. Similarly, as the pointing device moves the pointing device icon 80 closer to the area of the screen circumscribed by border 84 of FIG. 16 the border 84 is displayed. However, because the pointing device icon 80 indicates a screen location which is in closer proximity to the area of the screen circumscribed by border 82 the border 84 is less prominent on the screen than border 82. This less prominent border 84 is created by having less variance from the underlying color characteristics of the border picture elements than is present in border 82 but may also be created by other methods such as having a thinner border than border 82. Thus, borders may be displayed or not displayed based upon their proximity to a location of the screen designated by a pointing device or, they may become more prominent the closer the pointing location of the screen designated by a pointing device is to the region of the screen circumscribed by the border.

While the present invention has been illustrated with respect to levels of grey scale in the figures, the present invention is not limited to the use with grey scale user interfaces but may be utilized in color user interfaces. In such case, the third color characteristic, hue, may also be varied to create context-sensitive borders. However, as hue is varied the borders may be less like their underlying picture elements in color and therefore tend to detract more from the appearance of the user interface. Furthermore, because the degree of variance from the neighboring picture elements of a border may appear differently on different display devices or because user preferences may differ on how "subtle" the borders of the user selectable options may be, the variance of the border picture elements from the neighboring picture elements may be user definable.

As will be appreciated by those of skill in this art, the preceding examples are provided, not to limit or define the scope of the present invention, but to illustrate the nature of the present invention and possible uses for the teachings of the present invention. These examples may be modified in many different ways while still obtaining the benefits of the teachings of the present invention.

As will be appreciated by those of skill in this art, the above described aspects of the present invention may be provided as methods, apparatus or computer program products. Accordingly, it will be understood that each aspect of the above-described present invention, and combinations of aspects of the present invention, can be implemented by computer program instructions. These computer program instructions may be loaded onto a computer or other programmable data processing apparatus to produce a machine, such that the instructions which execute on the computer or other programmable data processing apparatus create means for implementing the functions and aspects of the present invention described above. These computer program instructions may also be stored in a computer-readable memory that can direct a computer or other programmable data processing apparatus to function in a particular manner, such that the instructions stored in the computer-readable memory produce an article of manufacture including instruction means which implement the function or aspects described herein. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the aspects of the present invention described and claimed herein.

Accordingly, the above description of the present invention supports combinations of means for performing the specified functions, combinations of steps for performing the specified functions and program instruction means for performing the specified functions. It will also be understood that each aspect or combination of aspects of the present invention described and claimed herein can be implemented by special purpose hardware-based computer systems which perform the specified functions or steps, or combinations of special purpose hardware and computer instructions.

In the drawings, specification and examples, there have been disclosed typical preferred embodiments of the invention and, although specific terms are employed, these terms are used in a generic and descriptive sense only and not for purposes of limitation, the scope of the invention being set forth in the following claims.

That which is claimed is:

1. A method of displaying a user selectable option in a user interface environment displayed on a display device having a plurality of picture elements, the method comprising the steps of:

providing a border to the user selectable option comprised of a plurality of border picture elements wherein color characteristics from picture elements neighboring the border are varied to define the color characteristics of the border picture elements.

2. A method according to claim 1, wherein said providing step further comprises the step of providing a three dimensional appearance to the user selectable option.

3. A method according to claim 1, wherein the user selectable option is represented on the screen by an icon.

4. A method according to claim 3, wherein said providing step further comprises the step of providing a border which has a different perimeter than the icon corresponding to the user selectable option.

5. A method according to claim 1, further comprising the step of providing a button to designate a user selectable option.

6. A method according to claim 1 wherein said providing step further comprises the steps of:

providing a first border section comprised of picture elements circumscribing less than the total perimeter of the user selectable option, wherein color characteristics of picture elements of the first border section are selected to simulate light incident on a surface defined by the first border section; and providing a second border section comprised of picture elements circumscribing less than the total perimeter of the user selectable option, wherein the characteristics of picture elements of the second border section are selected to simulate a surface defined by the second border section appearing in a shadow; and wherein the first and the second border sections are positioned about the user selectable option so as to make the user selectable option appear three dimensional.

7. A method according to claim 6, wherein the first and the second border sections are positioned about the user selectable option so as to make the user selectable option appear to be raised from the surrounding background.

8. A method according to claim 7, wherein the positions of the first and the second border sections are reversed when the user selectable option is selected so as to make the user selectable option appear as a depression in the surrounding background.

9. A method according to claim 6, wherein said color characteristics of the neighboring picture elements comprise brightness information and wherein the picture elements of the first border section have a higher brightness than the neighboring picture elements of the first border section and wherein the picture elements of the second border section have a lower brightness than the neighboring picture elements of the second border section.

10. A method according to claim 6, wherein said color characteristics of the neighboring picture elements comprises saturation information and wherein the picture elements of the first border section have a lower saturation than the neighboring picture elements of the first border section and wherein the picture elements of the second border section have a higher saturation than the neighboring picture elements of the second border section.

11. A method according to claim 1 wherein the user interface comprises a three dimensional graphical user interface.

12. A method according to claim 1 wherein said providing step comprises providing a border to the user selectable option wherein the neighboring picture elements comprise picture elements of the background region adjacent the picture elements of the border and are outside the border.

13. A method according to claim 1 wherein said providing step comprises providing a border to the user selectable option wherein the neighboring picture elements comprise picture elements adjacent the picture elements of the border and are within the border.

14. A method according to claim 1 wherein said providing step comprises providing a border to the user selectable option wherein the neighboring picture elements are the picture elements of the non-varied picture elements of the user interface which correspond to the picture elements of the border.

15. A method according to claim 1, wherein said providing step provides a first border, the method further comprising:

providing at least one additional border comprising picture elements adjacent to the first border, wherein color characteristics of picture elements of the at least one additional border are selected based upon the color characteristics of the first border and are selected to enhance the three dimensional appearance of the user selectable option.

16. A method according to claim 1, wherein said providing step further comprises the step of providing a border which defines a region of the screen wherein a selection made while a pointing device is positioned in the region of the screen within the border selects the user selectable option.

17. A method according to claim 1, wherein said providing step is preceded by the step of determining the location on the screen pointed to by a pointing device and wherein said providing step further comprises providing the border when said determining step determines that the location pointed to by the pointing device is located inside the region of the screen circumscribed the border.

18. A method according to claim 1 wherein the user interface includes a plurality of user selectable options, the method further comprising the step of:
   determining the location on the screen pointed to by a pointing device;
   providing borders to the plurality of user selectable options wherein the borders are comprised of picture elements and wherein color characteristics of the picture elements of the borders are defined by varying the color characteristics from the picture elements which neighbor the picture elements of the borders; and
   varying the color characteristics of the borders of the user selectable options such that the borders corresponding to the user selectable options in closest proximity on the screen to the location pointed to by the pointing device are the most prominent.

19. A method according to claim 1, wherein said providing step comprises providing a border to the user selectable option wherein the manner in which the color characteristics from the neighboring picture elements is varied is definable by a user.

20. A method of displaying a user selectable option in a user interface environment displayed on a display device having a plurality of picture elements, the method comprising the steps of:
   providing a context sensitive border to the user selectable option such that the border is visible without detracting from the appearance of the user interface.

21. A method according to claim 20, wherein said providing step further comprises the step of providing a three dimensional appearance to the user selectable option.

22. A method according to claim 20, wherein the user selectable option is represented on the screen by an icon.

23. A method according to claim 22, wherein said providing step further comprises the step of providing a border which has a different perimeter than the icon corresponding to the user selectable option.

24. A method according to claim 20 wherein said providing step further comprises the steps of:
   providing a first border section comprised of picture elements circumscribing less than the total perimeter of the user selectable option, wherein color characteristics of picture elements of the first border section are selected to simulate light incident on a surface defined by the first border section; and
   providing a second border section comprised of picture elements circumscribing less than the total perimeter of the user selectable option, wherein the characteristics of picture elements of the second border section are selected to simulate a surface defined by the second border section appearing in a shadow; and
   wherein the first and the second border sections are positioned about the user selectable option so as to make the user selectable option appear three dimensional.

25. A method according to claim 24, wherein the first and the second border sections are positioned about the user selectable option so as to make the user selectable option appear to be raised from the surrounding background.

26. A method according to claim 25, wherein the positions of the first and the second border sections are reversed when the user selectable option is selected so as to make the user selectable option appear as a depression in the surrounding background.

27. An apparatus for of displaying a user selectable option in a user interface environment comprising:
   a display device having a plurality of picture elements which define the appearance of the user interface environment; and
   means for providing a border to the user selectable option comprised of a plurality of picture elements wherein color characteristics from picture elements neighboring the border are varied to define the color characteristics of the picture elements of the border.

28. An apparatus according to claim 27 wherein said means for providing further comprises means for providing a three dimensional appearance to the user selectable option.

29. An apparatus according to claim 27, wherein the user selectable option is represented on the screen by an icon.

30. An apparatus according to claim 29, wherein said means for providing provides a border which has a different perimeter than the icon corresponding to the user selectable option.

31. An apparatus according to claim 27, further comprising means for providing a button to designate a user selectable option.

32. An apparatus according to claim 27 wherein said means for providing further comprises:
   means for providing a first border section comprised of picture elements circumscribing less than the total perimeter of the user selectable option, wherein color characteristics of picture elements of the first border section are selected to simulate light incident on a surface defined by the first border section; and
   means for providing a second border section comprised of picture elements circumscribing less than the total perimeter of the user selectable option, wherein the characteristics of picture elements of the second border section are selected to simulate a surface defined by the second border section appearing in a shadow; and
   wherein the first and the second border sections are positioned about the user selectable option so as to make the user selectable option appear three dimensional.

33. An apparatus according to claim 32, wherein said means for providing a first border section and said means for providing a second border section position said first and said second border sections about the user selectable option so as to make the user selectable option appear to be raised from the surrounding background.

34. An apparatus according to claim 33, wherein said means for providing a first border section and said means for providing a second border section reverse the positions of the first and the second border sections when the user selectable option is selected so as to make the user selectable option appear as a depression in the surrounding background.

35. An apparatus according to claim 32, wherein said color characteristics of the neighboring picture elements comprises brightness information and wherein the picture elements of the first border section have a higher brightness than the neighboring picture elements of the first border section and wherein the picture elements of the second border section have a lower brightness than the neighboring picture elements of the second border section.

36. An apparatus according to claim 32, wherein said color characteristics of the neighboring picture elements comprises saturation information and wherein the picture elements of the first border section have a lower saturation than the neighboring picture elements of the first border section and wherein the picture elements of the second border section have a higher saturation than the neighboring picture elements of the second border section.

37. An apparatus according to claim 27 wherein the user interface comprises a three dimensional graphical user interface.

38. An apparatus according to claim 27 wherein the neighboring picture elements comprise picture elements of the background region adjacent the picture elements of the border and are outside the border.

39. An apparatus according to claim 27 wherein the neighboring picture elements comprise picture elements adjacent the picture elements of the border and are within the border.

40. An apparatus according to claim 27 wherein the neighboring picture elements are the picture elements of the non-varied picture elements of the user interface which correspond to the picture elements of the border.

41. An apparatus according to claim 27, wherein said means for providing provides a first border, said apparatus further comprising:

means for providing at least one additional border comprising picture elements adjacent to the first border, wherein color characteristics of picture elements of the at least one additional border are selected based upon the color characteristics of the first border.

42. An apparatus according to claim 27, wherein the border provided by said means for providing defines a region of the screen, said apparatus further comprising:

a pointing device for designating a position of the screen based upon user input; and wherein a selection made while a pointing device is positioned in the region of the screen within the border selects the user selectable option.

43. An apparatus according to claim 27, further comprising:

a pointing device for designating a location on the screen based on user input;

means for determining the location on the screen pointed to by said pointing device; and wherein said means for providing further comprises means for providing the border when said means for determining determines that the location pointed to by said pointing device is located inside the region of the screen circumscribed the border.

44. An apparatus according to claim 27 wherein the user interface includes a plurality of user selectable options, the apparatus further comprising:

a pointing device for designating a location on the screen based on user input;

means for determining the location on the screen pointed to by said pointing device;

means for providing borders to the plurality of user selectable options wherein the borders are comprised of picture elements and wherein color characteristics of the picture elements of the borders are defined by varying the color characteristics from the picture elements which neighbor the picture elements of the borders; and means for varying the color characteristics of the borders of the user selectable options such that the borders corresponding to the user selectable options in closest proximity on the screen to the location determined by said determining means are the most prominent.

45. An apparatus according to claim 27, further comprising user input means for defining the manner in which the color characteristics from the neighboring picture elements are varied.

46. A computer program product for displaying a user selectable option in a user interface environment, the computer program product comprising:

a computer-readable storage medium having computer-readable program code means embodied in said medium, said computer-readable program code means comprising:

computer readable program code means for displaying a plurality of picture elements on a display device; and computer readable program code means for providing a border to the user selectable option comprised of a plurality of picture elements wherein color characteristics from picture elements neighboring the border are varied to define the color characteristics of the picture elements of the border.

47. A computer program product according to claim 46 wherein said computer readable program code means for providing further comprises computer readable program code means for providing a three dimensional appearance to the user selectable option.

48. A computer program product according to claim 46, wherein the user selectable option is represented on the screen by an icon.

49. A computer program product according to claim 48, wherein said computer readable program code means for providing provides a border which has a different perimeter than the icon corresponding to the user selectable option.

50. A computer program product according to claim 46, further comprising computer readable program code means for providing a button to designate a user selectable option.

51. A computer program product according to claim 46 wherein said computer readable program code means for providing further comprises:

computer readable program code means for providing a first border section comprised of picture elements circumscribing less than the total perimeter of the user selectable option, wherein color characteristics of picture elements of the first border section are selected to simulate light incident on a surface defined by the first border section; and computer readable program code means for providing a second border section comprised of picture elements circumscribing less than the total perimeter of the user selectable option, wherein the characteristics of picture elements of the second border section are selected to simulate a surface defined by the second border section appearing in a shadow; and wherein the first and the second border sections are positioned about the user selectable option so as to make the user selectable option appear three dimensional.

52. A computer program product according to claim 51, wherein said computer readable program code means for providing a first border section and said computer readable program code means for providing a second border section position said first and said second border sections about the user selectable option so as to make the user selectable option appear to be raised from the surrounding background.

53. A computer program product according to claim 52, wherein said computer readable program code means for providing a first border section and said computer readable program code means for providing a second border section reverse the positions of the first and the second border sections when the user selectable option is selected so as to make the user selectable option appear as a depression in the surrounding background.

54. A computer program product according to claim 51, wherein said color characteristics of the neighboring picture elements comprises brightness information and wherein the picture elements of the first border section have a higher brightness than the neighboring picture elements of the first border section and wherein the picture elements of the second border section have a lower brightness than the neighboring picture elements of the second border section.

55. A computer program product according to claim 51, wherein said color characteristics of the neighboring picture elements comprises saturation information and wherein the picture elements of the first border section have a lower saturation than the neighboring picture elements of the first border section and wherein the picture elements of the second border section have a higher saturation than the neighboring picture elements of the second border section.

56. A computer program product according to claim 46 wherein the user interface comprises a three dimensional graphical user interface.

57. A computer program product according to claim 46 wherein the neighboring picture elements comprise picture elements of the background region adjacent the picture elements of the border and are outside the border.

58. A computer program product according to claim 46 wherein the neighboring picture elements comprise picture elements adjacent the picture elements of the border and are within the border.

59. A computer program product according to claim 46 wherein the neighboring picture elements are the picture elements of the non-varied picture elements of the user interface which correspond to the picture elements of the border.

60. A computer program product according to claim 46, wherein said computer readable program code means for providing provides a first border, said computer program product further comprising:

computer readable program code means for providing at least one additional border comprising picture elements adjacent to the first border, wherein color characteristics of picture elements of the at least one additional border are selected based upon the color characteristics of the first border.

61. A computer program product according to claim 46, wherein the border provided by said computer readable program code means for providing defines a region of the screen, and wherein a selection made while a pointing device is positioned in the region of the screen within the border selects the user selectable option.

62. A computer program product according to claim 46, further comprising:

computer readable program code means for determining the location on the screen pointed to by a pointing device; and wherein said computer readable program code means for providing further comprises computer readable program code means for providing the border when said computer readable program code means for determining determines that the location pointed to by said pointing device is located inside the region of the screen circumscribed the border.

63. A computer program product according to claim 46 wherein the user interface includes a plurality of user selectable options, the computer program product further comprising:

computer readable program code means for determining the location on the screen pointed to by a pointing device;

computer readable program code means for providing borders to the plurality of user selectable options wherein the borders are comprised of picture elements and wherein color characteristics of the picture elements of the borders are defined by varying the color characteristics from the picture elements which neighbor the picture elements of the borders; and computer readable program code means for varying the color characteristics of the borders of the user selectable options such that the borders corresponding to the user selectable options in closest proximity on the screen to the location determined by said determining computer readable program code means are the most prominent.

64. A computer program product according to claim 46, further comprising user input computer readable program code means for defining the manner in which the color characteristics from the neighboring picture elements are varied.

* * * * *

UNITED STATES PATENT AND TRADEMARK OFFICE
CERTIFICATE OF CORRECTION

| | | |
|---|---|---|
| PATENT NO. | : 5,742,287 | |
| APPLICATION NO. | : 08/682204 | |
| DATED | : April 21, 1998 | |
| INVENTOR(S) | : David Bruce Lection and Mark Edward Molander | |

It is certified that error appears in the above-identified patent and that said Letters Patent is hereby corrected as shown below:

The Tile Page showing the illustrative figure should be deleted to be replaced with the attached Title Page.

In the Drawings, Figs 1-16 should be replaced with the corrected Figs 1-16 as shown on the attached pages.

Signed and Sealed this
Seventeenth Day of April, 2012

David J. Kappos
*Director of the United States Patent and Trademark Office*

United States Patent [19]

Lection et al.

[11] Patent Number: 5,742,287

[45] Date of Patent: Apr. 21, 1998

[54] CONTEXT SENSITIVE BORDERS WITH COLOR VARIATION FOR USER SELECTABLE OPTIONS

[75] Inventors: David Bruce Lection, Raleigh; Mark Edward Molander, Cary, both of N.C.

[73] Assignee: International Business Machines Corp., Armonk, N.Y.

[21] Appl. No.: 682,204

[22] Filed: Jul. 17, 1996

[51] Int. Cl.[6] .................................................. G06F 3/00
[52] U.S. Cl. ........................ 345/355; 345/349; 345/352; 345/126
[58] Field of Search ................................ 345/326–358, 345/126–127, 131, 139, 145–146, 902

[56] References Cited

U.S. PATENT DOCUMENTS

| | | | |
|---|---|---|---|
| 4,868,766 | 9/1989 | Oosterholt | 345/355 X |
| 5,179,656 | 1/1993 | Lisle | 345/355 |
| 5,276,795 | 1/1994 | Hoeber et al. | 345/353 |
| 5,295,243 | 3/1994 | Robertson et al. | 345/355 |
| 5,303,388 | 4/1994 | Kreitman et al. | 345/355 |
| 5,347,628 | 9/1994 | Brewer et al. | 345/355 |
| 5,381,158 | 1/1995 | Takahara et al. | 345/355 |
| 5,388,202 | 2/1995 | Squires et al. | 345/355 |
| 5,452,406 | 9/1995 | Butler et al. | 345/126 |
| 5,463,722 | 10/1995 | Venolia | 345/355 X |
| 5,555,354 | 9/1996 | Strasnick et al. | 395/355 X |
| 5,608,850 | 3/1997 | Robertson | 345/127 |

Primary Examiner—John E. Breene
Attorney, Agent, or Firm—Jeanine S. Ray-Yarletts

[57] ABSTRACT

Methods, data processing systems and program products for providing user interfaces with context sensitive borders to user selectable options. The context sensitive borders are created by providing a border to a user selectable option comprised of a plurality of picture elements wherein color characteristics from picture elements neighboring the border are varied to define the color characteristics of the picture elements of the border. The borders provided may provide a three dimensional appearance to the user selectable option and the user selectable option may be represented on the screen by an icon. The border may have a different perimeter than the icon corresponding to the user selectable option. The neighboring picture elements from which the border is derived may be adjacent to the border or may be the underlying elements of the border. The color characteristics may be varied by varying brightness and/or saturation.

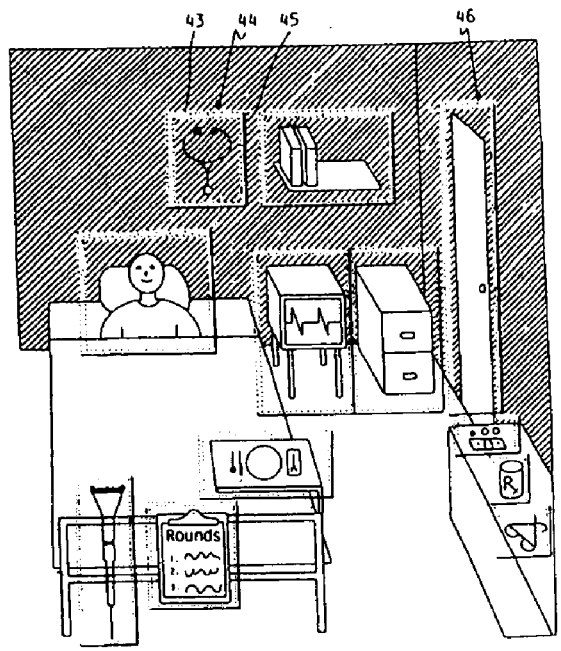

64 Claims, 16 Drawing Sheets